United States Patent
Paretti et al.

(10) Patent No.: US 10,182,141 B2
(45) Date of Patent: Jan. 15, 2019

(54) APPARATUS AND METHOD FOR PROVIDING TRANSITIONS BETWEEN SCREENS

(75) Inventors: Christopher Paretti, San Francisco, CA (US); William Lindmeier, San Francisco, CA (US)

(73) Assignee: Nokia Technologies Oy, Espoo (FI)

( * ) Notice: Subject to any disclaimer, the term of this patent is extended or adjusted under 35 U.S.C. 154(b) by 442 days.

(21) Appl. No.: 13/334,415

(22) Filed: Dec. 22, 2011

(65) Prior Publication Data

US 2013/0162516 A1  Jun. 27, 2013

(51) Int. Cl.
| | |
|---|---|
| G06F 1/00 | (2006.01) |
| H04M 1/725 | (2006.01) |
| G06F 3/0488 | (2013.01) |
| G06F 3/048 | (2013.01) |

(52) U.S. Cl.
CPC ........ *H04M 1/72544* (2013.01); *G06F 3/048* (2013.01); *G06F 3/0488* (2013.01); *H04M 2250/22* (2013.01)

(58) Field of Classification Search
CPC ...... G06F 1/165; G06F 1/1616; G06F 1/1677; G06F 1/32; G06F 1/3203; G06F 1/3265
USPC ............ 345/1, 2, 3, 76–204, 473, 474, 846; 178/18.01–18.11; 455/566; 715/762, 863
See application file for complete search history.

(56) References Cited

U.S. PATENT DOCUMENTS

| | | | |
|---|---|---|---|
| 5,821,930 A | * | 10/1998 | Hansen .......................... 715/702 |
| 7,315,312 B2 | | 1/2008 | Hemmings |
| 8,019,389 B2 | * | 9/2011 | Kim et al. ..................... 455/566 |
| 8,365,099 B2 | * | 1/2013 | Cho et al. ...................... 715/863 |
| 8,400,414 B2 | * | 3/2013 | Seo et al. ....................... 345/173 |
| 8,433,626 B1 | | 4/2013 | McDaniel et al. |

(Continued)

FOREIGN PATENT DOCUMENTS

| | | |
|---|---|---|
| EP | 2 230 623 A1 | 9/2010 |
| EP | 2 284 675 A2 | 2/2011 |

(Continued)

OTHER PUBLICATIONS

"Setting up and using Smart Unlock on the Samsung Jet"; Dated Sep. 10, 2009; [Online]; [Retrieved on Oct. 18, 2011]; Retrieved from the Internet <URL: http://www.knowyourmobile.com/samsung/samsungjet/samsungjetuserguides/317988/setting_up_and_using_smart_unlock_on_the_samsung_jet.html>.

(Continued)

*Primary Examiner* — Michael Faragalla
(74) *Attorney, Agent, or Firm* — Alston & Bird LLP

(57) ABSTRACT

An apparatus, method, and computer program product are described that determine a destination screen for display and provide for a visual transition between an origin screen and the destination screen based on a position of a user input and a direction of the movement component of the input. The origin screen may, for example, associate certain areas of the screen with certain destination screens, such that an input received in one area invokes one destination screen and an input received in another area invokes another destination screen. The destination screen may also be determined based on the direction of the movement component of the input. Thus, one of several destination screens may be accessible to the user and may be determined based on the characteristics of the input received.

15 Claims, 18 Drawing Sheets

(56) References Cited

U.S. PATENT DOCUMENTS

| | | | |
|---|---|---|---|
| 2006/0026521 A1* | 2/2006 | Hotelling | G06F 3/0418 |
| | | | 715/702 |
| 2008/0040692 A1* | 2/2008 | Sunday et al. | 715/863 |
| 2009/0172532 A1* | 7/2009 | Chaudhri | G06F 3/0482 |
| | | | 715/702 |
| 2009/0249240 A1* | 10/2009 | Lundy et al. | 715/771 |
| 2010/0146412 A1* | 6/2010 | Nagase | 715/760 |
| 2010/0162182 A1* | 6/2010 | Oh | G06F 3/04883 |
| | | | 715/863 |
| 2010/0302278 A1 | 12/2010 | Shaffer et al. | |
| 2011/0028186 A1* | 2/2011 | Lee | G06F 3/0486 |
| | | | 455/566 |
| 2011/0115728 A1* | 5/2011 | Kwak et al. | 345/173 |
| 2011/0302278 A1 | 12/2011 | Shaffer et al. | |
| 2012/0089947 A1* | 4/2012 | Lee et al. | 715/839 |
| 2013/0007663 A1* | 1/2013 | Piippo | 715/821 |
| 2013/0135316 A1* | 5/2013 | Choy et al. | 345/474 |

FOREIGN PATENT DOCUMENTS

| | | |
|---|---|---|
| EP | 2 330 808 A2 | 6/2011 |
| WO | WO 2009/143075 A2 | 11/2009 |
| WO | WO 2010/043277 A1 | 4/2010 |
| WO | WO 2010/074468 A2 | 7/2010 |

OTHER PUBLICATIONS

"Speed Dialing—A Few Thoughts on How to Implement"; Dated Jul. 6, 2007; [Online]; [Retrieved on Oct. 18, 2011]; Retrieved from the Internet <URL:http://forums.macrumors.com/archive/index.php//t-326226.html>.

International Search Report and Written Opinion for Application No. PCT/FI2012/051232 dated Apr. 5, 2013.

Ferrara, D.; "*Macromedia Flash Transition Effects*"; [Online]; [Retrieved on Nov. 4, 2011]; Retrieved from the Internet <URL: http://www.ehow.com/list_6564888_macromedia-flash-transition-effects.html.

Liesaputra, V., et al.; "*Computer graphics techniques for modeling page turning;*" International Journal on Digital Libraries 10.2-3; pp. 93-121; dated 2009.

Transcription of YouTube Video (http://www.youtube.com/watch?v=dPvY0B0yl8Y); 4 minutes, 44 seconds total duration; Transcript portion from 1 minute 16 seconds to 4 minutes; Last Accessed Jan. 30, 2012.

International Preliminary Report on Patentability from International Application No. PCT/FI2012/051282, dated Jun. 24, 2014.

Notice of Allowance for U.S. Appl. No. 13/334,431 dated Dec. 20, 2016.

\* cited by examiner

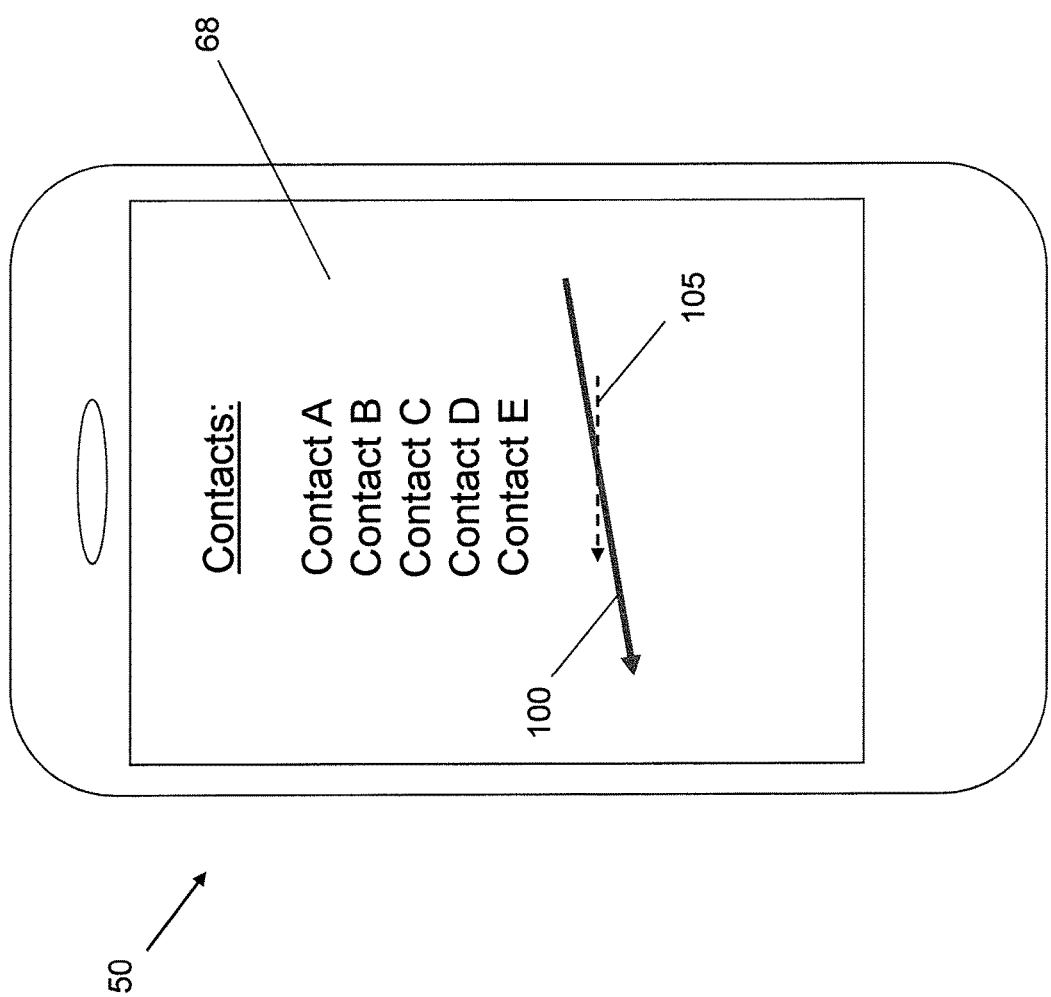

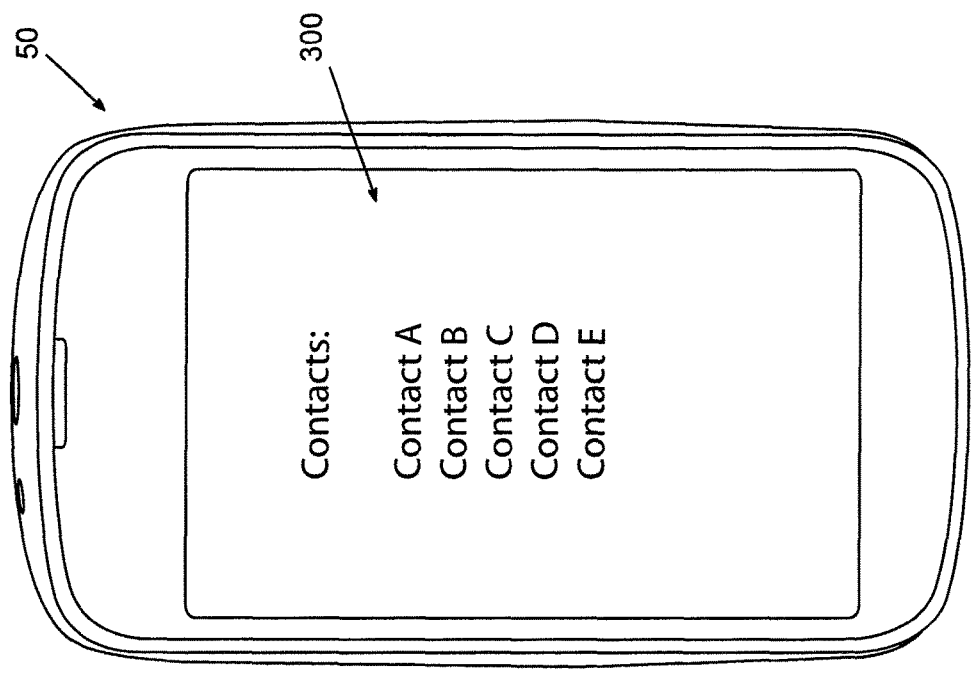
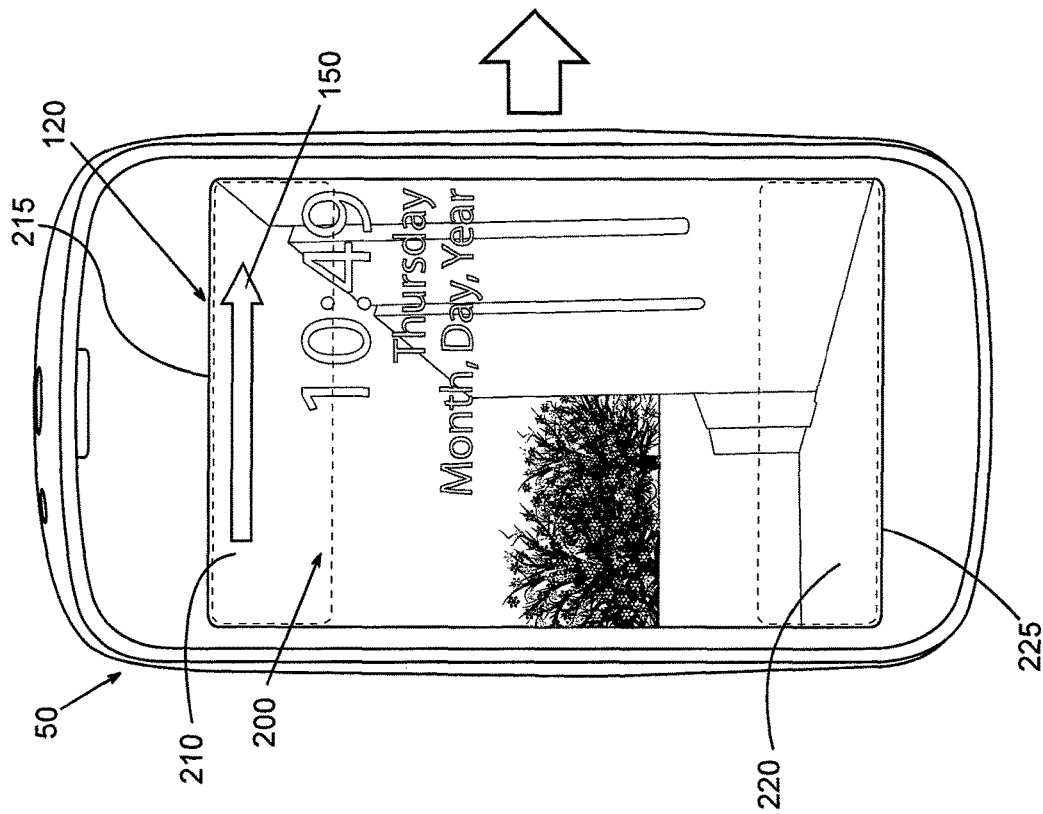
FIG. 4B
FIG. 4A

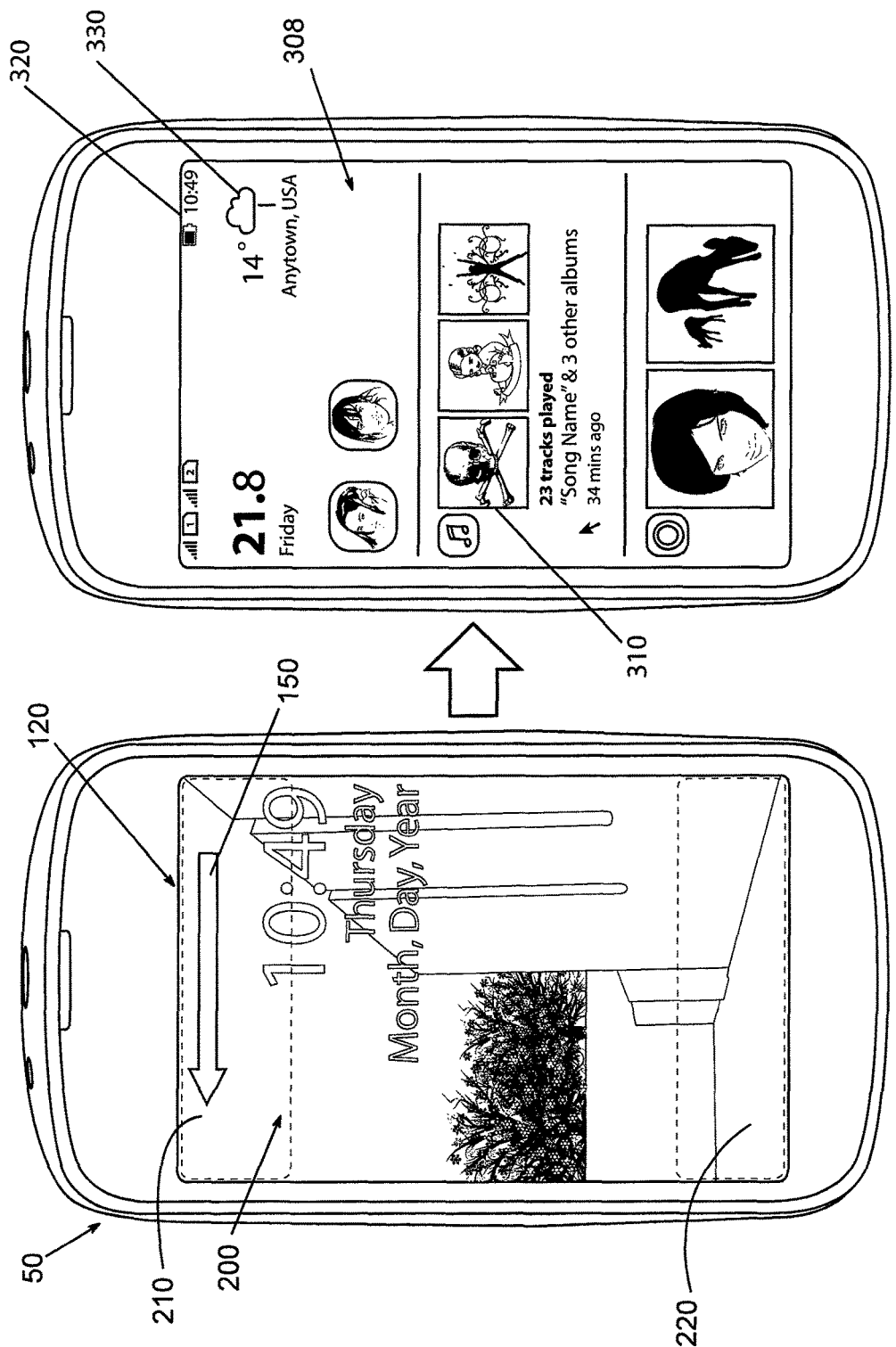

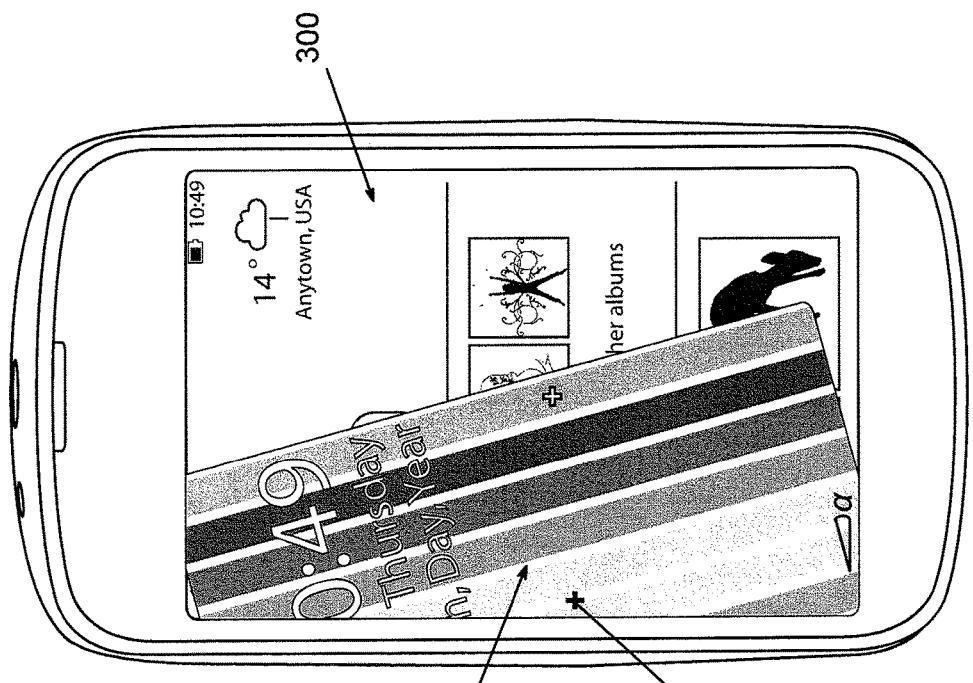
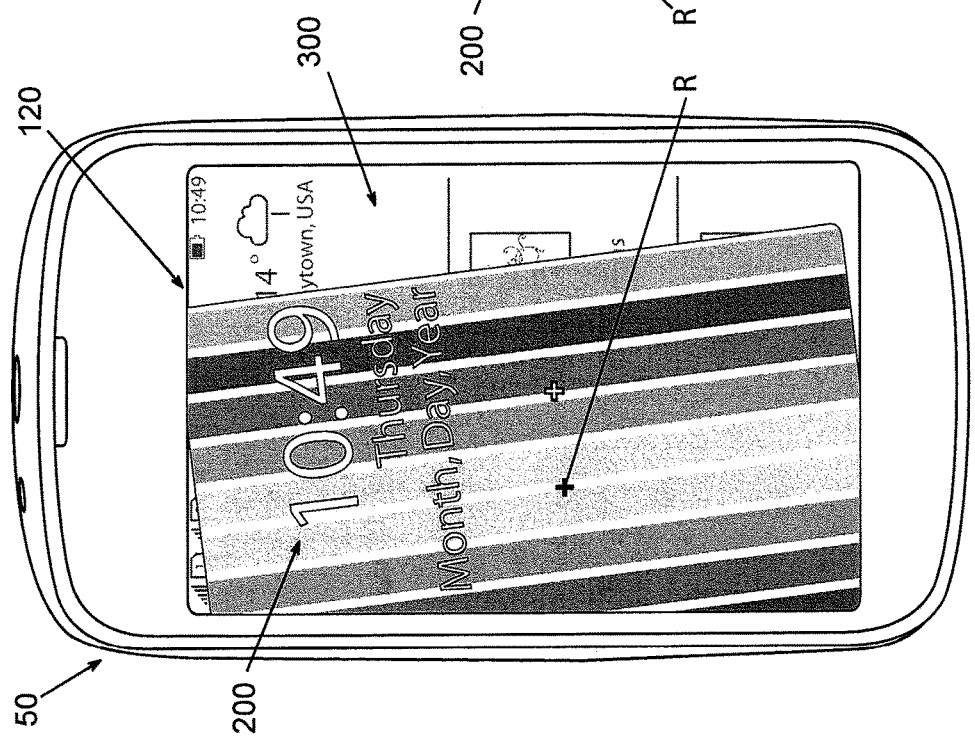
FIG. 10D
FIG. 10C

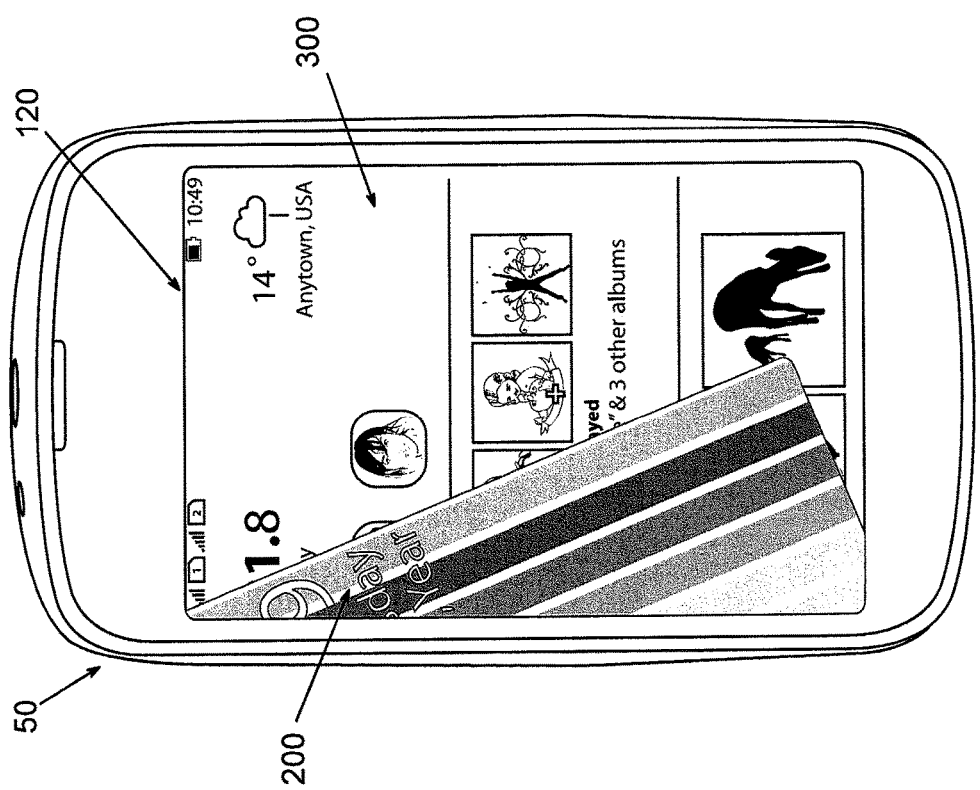

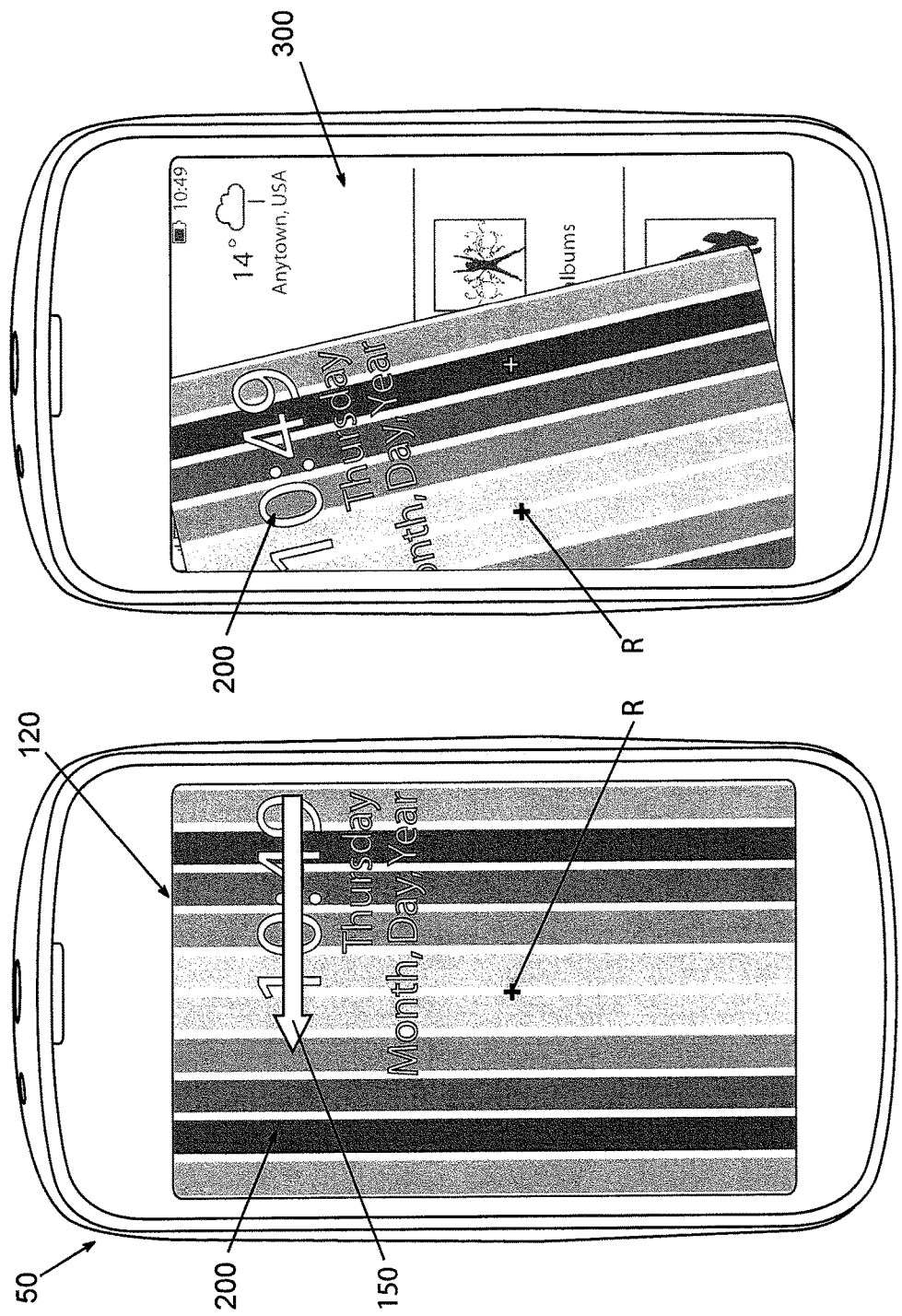

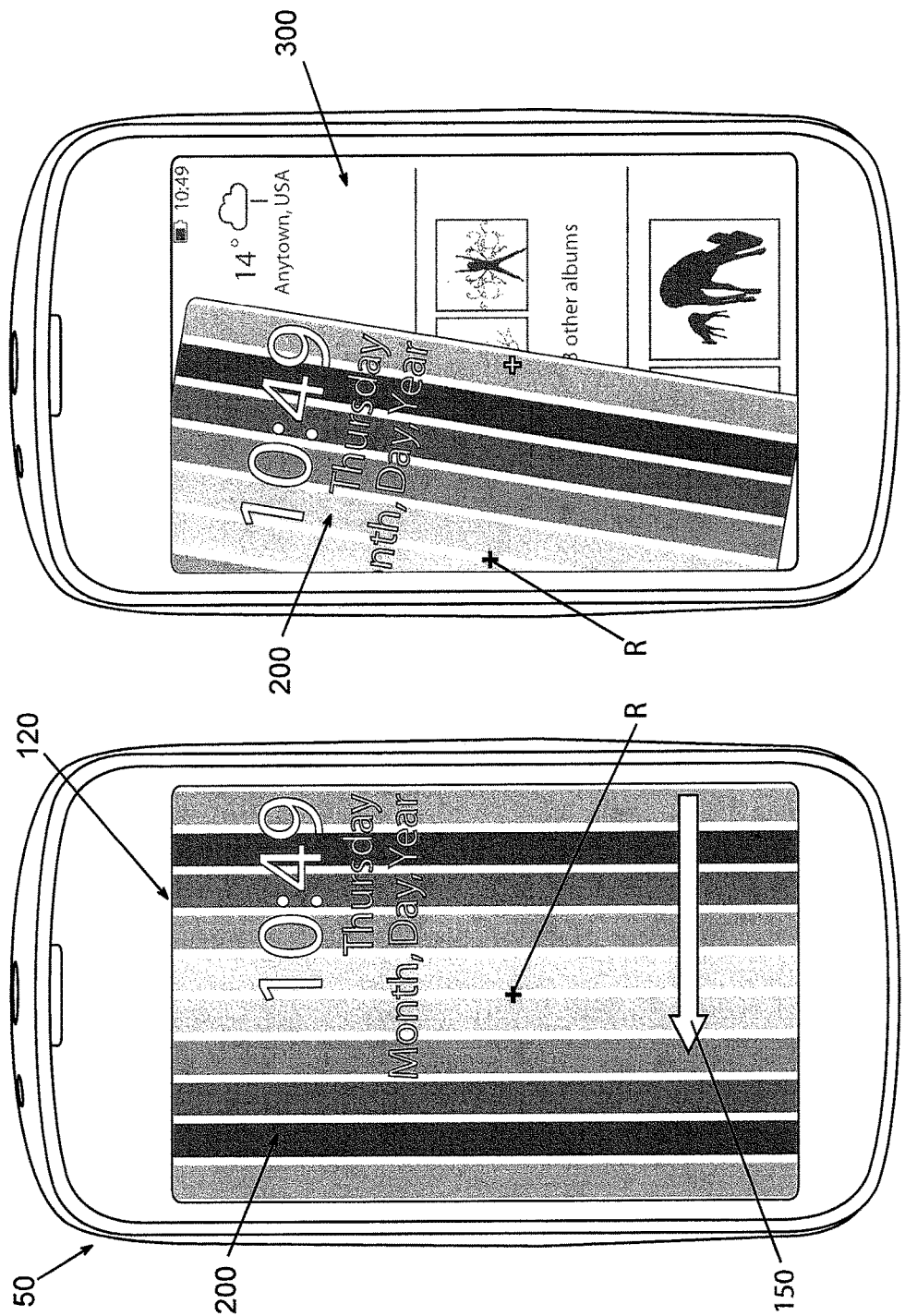

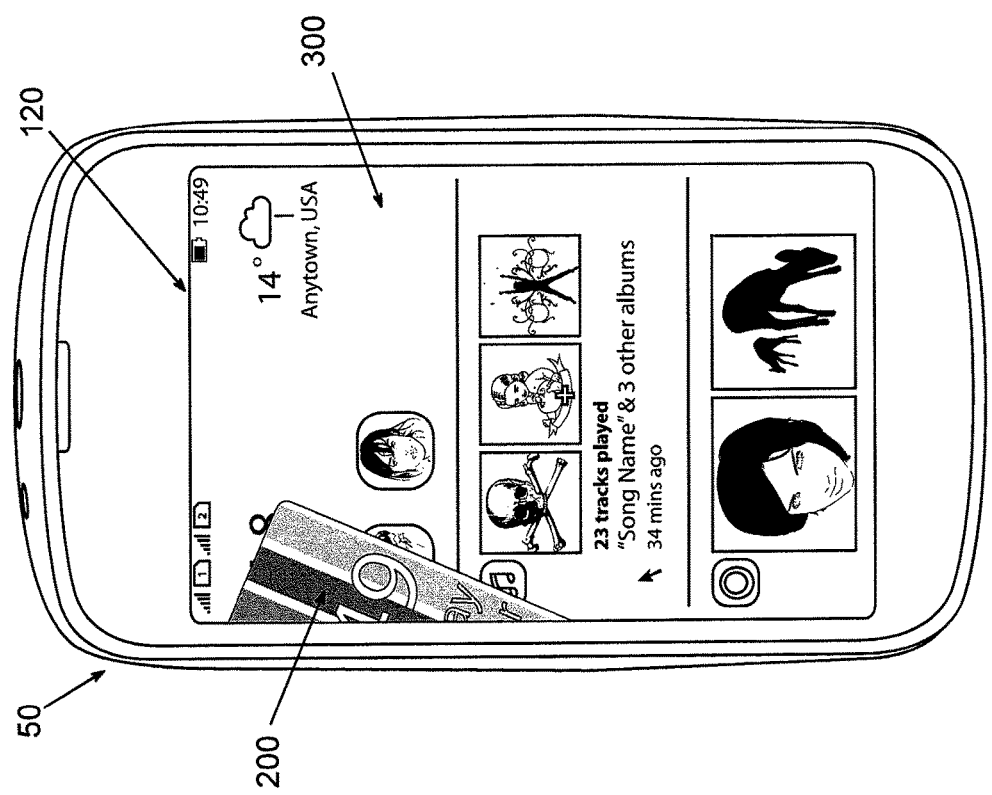

APPARATUS AND METHOD FOR PROVIDING TRANSITIONS BETWEEN SCREENS

TECHNOLOGICAL FIELD

Embodiments of the present invention relate generally to providing transitions between screens that are presented on displays of devices based on characteristics of the input provided by the user.

BACKGROUND

Advancements in mobile device technology have provided mobile devices, such as cellular telephones and portable digital assistants (PDAs), that have increased functionality and allow users greater access and control of information. Users may access a number of screens displaying information, may navigate between screens, and may manipulate the information presented on the screens to arrange the information in a way that suits the user's preferences. Moreover, some of the screens accessed by the user may comprise information associated with one or more programs that may or may not be in execution. For example, some programs may be running, while other programs may be dormant, but may be invoked upon user interaction with a representation of the program (such as an icon).

The portable nature of mobile devices generally means that the size of the displays provided on the mobile devices is relatively small. Thus, users may, at times, only see portions of the information they have accessed depending on how much information can be presented within the area of the display provided.

Accordingly, it may be desirable to provide an improved mechanism for conveying to the user that the device is transitioning views from one screen to another and for indicating which screens are being accessed.

BRIEF SUMMARY OF EXAMPLE EMBODIMENTS

Accordingly, embodiments of an apparatus, method, and computer program product are described that can provide for transitions between screens. In particular, embodiments of an apparatus for providing for transitions between screens may include at least one processor and at least one memory including computer program code. The at least one memory and the computer program code may be configured to, with the processor, cause the apparatus to at least provide for display of an origin screen, receive an input from a user comprising a movement component, determine a destination screen for display from a plurality of screens based on a position of the input and a direction of the movement component of the input, and provide for a visual transition from the origin screen to the destination screen.

In some cases, the origin screen may define at least a first area and a second area, and the at least one memory and the computer program code may be further configured to, with the processor, cause the apparatus to determine a first screen for display based on the position of the input being within the first area and to determine a second screen for display based on the position of the input being within the second area. The at least one memory and the computer program code may be further configured to, with the processor, cause the apparatus to provide an indication on the origin screen of an association of the first area with the first screen and an association of the second area with the second screen, respectively. The at least one memory and the computer program code may be further configured to, with the processor, cause the apparatus to determine a first screen for display based on the direction of the movement component being a first direction and to determine a second screen for display based on the direction of the movement component being a second, different direction.

The origin screen may define at least a first area and a second area, and the at least one memory and the computer program code may be further configured to, with the processor, cause the apparatus to determine a first screen for display based on the direction of the movement component being a first direction and based on the position of the input being within the first area, to determine a second screen for display based on the direction of the movement component being a second direction and based on the position of the input being within the first area, and to determine a third screen for display based on the position of the input being within the second area. Additionally or alternatively, the at least one memory and the computer program code may be further configured to, with the processor, cause the apparatus to determine the destination screen for display based on an initial contact position of the input.

In some cases, the origin screen may represent a first interactive content and the destination screen may represent a second interactive content. The origin screen may be a lock screen, and the at least one memory and the computer program code may be further configured to, with the processor, cause the apparatus to unlock the lock screen upon receipt of the input based on at least one of the position of the input and the direction of the movement component of the input.

In other embodiments, a method and a computer program product are described for providing for transitions between screens. The method and computer program product comprise providing for display of an origin screen; receiving an input from a user comprising a movement component; determining a destination screen for display from a plurality of screens based on a position of the input and a direction of the movement component of the input; and providing for a visual transition from the origin screen to the destination screen.

The origin screen may define at least a first area and a second area, and determining the destination screen may comprise determining a first screen for display based on the position of the input being within the first area and determining a second screen for display based on the position of the input being within the second area. The method and computer program product may further comprise providing an indication on the origin screen of an association of the first area with the first screen and an association of the second area with the second screen, respectively. In some cases, determining the destination screen may comprise determining a first screen for display based on the direction of the movement component being a first direction and determining a second screen for display based on the direction of the movement component being a second, different direction.

Additionally or alternatively, the origin screen may define at least a first area and a second area, and determining the destination screen may comprise determining a first screen for display based on the direction of the movement component being a first direction and based on the position of the input being within the first area, determining a second screen for display based on the direction of the movement component being a second direction and based on the position of the input being within the first area, and determining a third screen for display based on the position of the input being within the second area. Furthermore, determining the destination screen for display may comprise determining the destination screen for display based on an initial contact position of the input.

The origin screen may represent a first interactive content, and the destination screen may represent a second interactive content. In some cases, the origin screen may be a lock screen, and determining the destination screen may comprise unlocking the lock screen upon receipt of the input based on at least one of the position of the input and the direction of the movement component of the input.

In still other embodiments, an apparatus is described for providing for transitions between screens. The apparatus may include means for providing for display of an origin screen; means for receiving an input from a user comprising a movement component; means for determining a destination screen for display from a plurality of screens based on a position of the input and a direction of the movement component of the input; and means for providing for a visual transition from the origin screen to the destination screen.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 illustrates a stroke gesture including a movement component according to an example embodiment of the present invention;

FIGS. 4A-4B illustrate a visual transition from an origin screen to a first screen according to an example embodiment of the present invention;

FIGS. 5A-5B illustrate a visual transition from an origin screen to a second screen according to an example embodiment of the present invention;

FIGS. 10A-10E illustrate a visual transition provided by applying a graphical effect to the display of the origin screen, where the graphical effect includes a translation aspect and a rotational aspect, where the input is applied near a central location of the viewing area according to an example embodiment of the present invention;

FIGS. 11A-11C illustrate a visual transition provided by applying a graphical effect to the display of the origin screen, where the graphical effect includes a translation aspect and a rotational aspect, where the input is applied near an upper location of the viewing area according to an example embodiment of the present invention;

Figure 13:
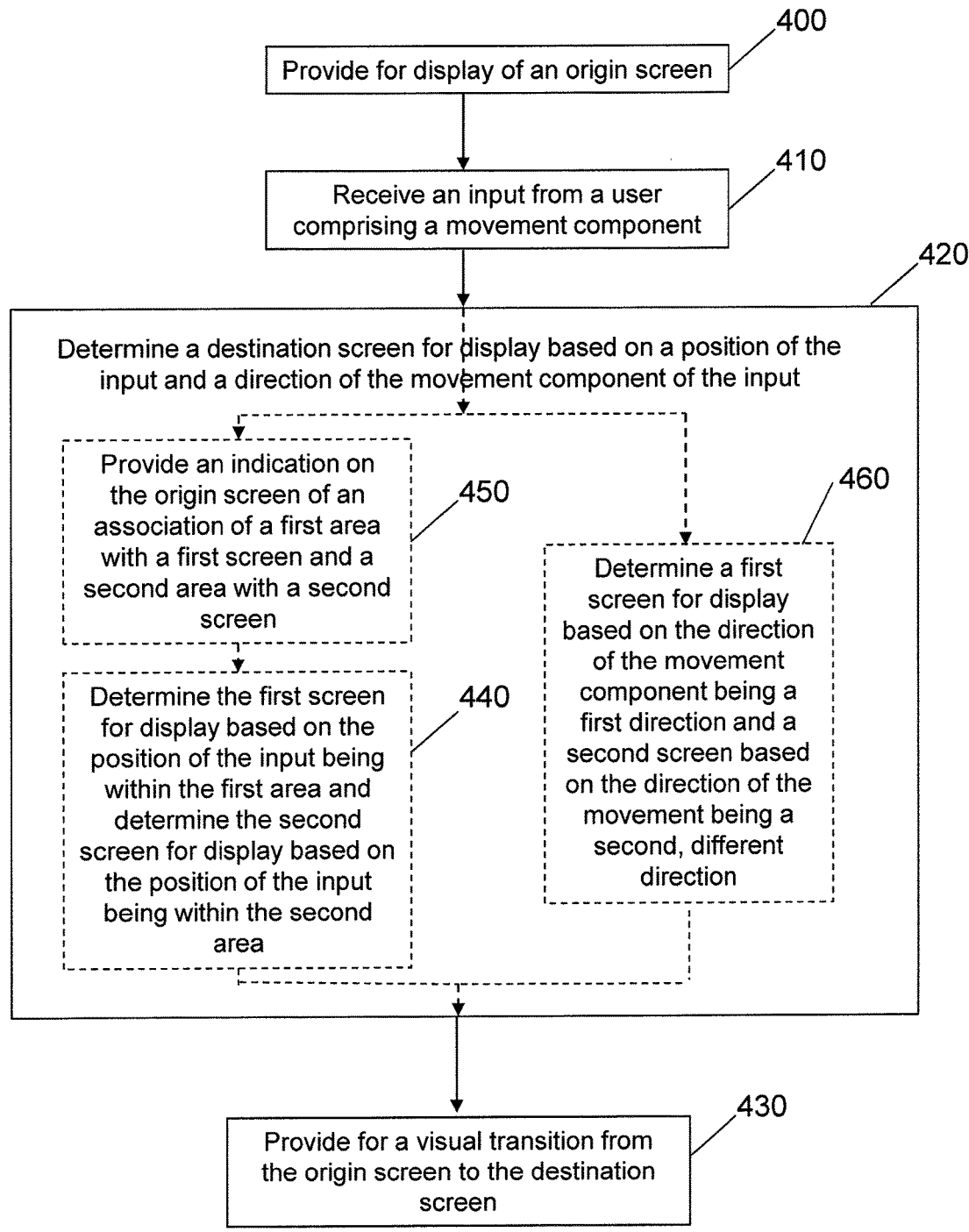
Figure 14:
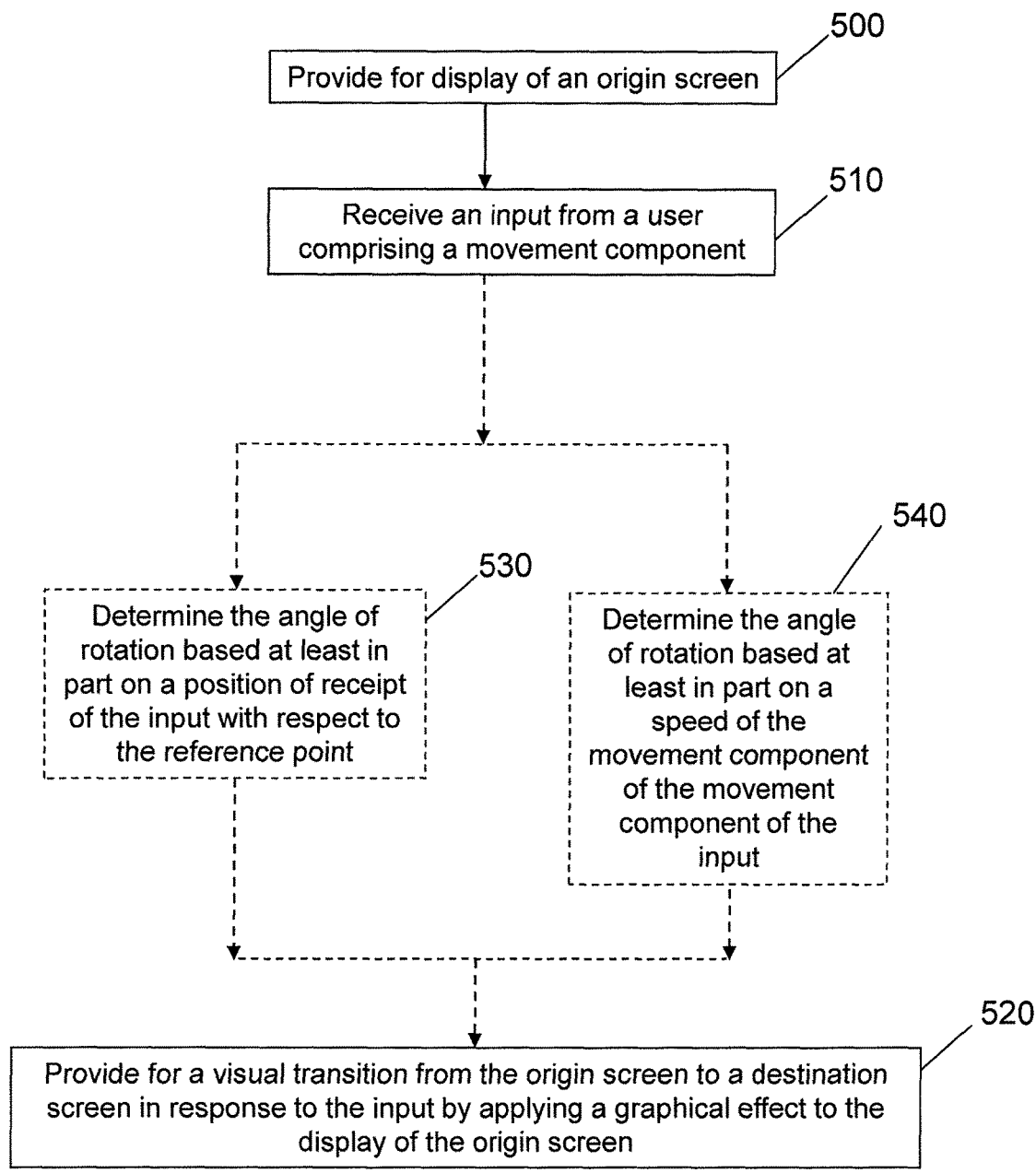

FIGS. 12A-12C illustrate a visual transition provided by applying a graphical effect to the display of the origin screen, where the graphical effect includes a translation aspect and a rotational aspect, where the input is applied near a lower location of the viewing area according to an example embodiment of the present invention; and FIGS. 13 and 14 illustrate flowcharts of methods of providing for visual transitions from an origin screen to a destination screen according to another example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As noted above, mobile terminals, including devices such as portable digital assistants (PDAs) and cellular telephones, are becoming smaller in size to allow for greater portability to the user. With the decrease in size of such devices, however, comes a decrease in the space available for displaying information. In other words, the size of the viewing area through which interactive content (e.g., contacts, e-mail messages, games, etc.) is presented to the user has become more limited as a result of more compact devices.

In part to compensate for this decrease in the size of the viewing area, such devices may be provided with additional functionality to allow the user to interact with and manipulate the displayed content. For example, a user may be able to zoom in on certain portions of the displayed content to read small print and may be able to pan (e.g., shift the displayed image in a particular direction) to view portions of the content that were previously outside the viewing area. In addition, the user may be able to expand certain aspects of the displayed content, such as to view details regarding a particular displayed icon or indication, launch a program, or open a new window within the viewing area.

The user's ability to manipulate the display and arrangement of content, however, may in some cases cause the user to forget the original configuration of the displayed content and/or how the user arrived at the current display configuration. For example, as a result of a touch input received via a touch screen display to pan the displayed screen to the left, the displayed screen may be shifted over to the extent that it appears to the user that a new screen has replaced the previously displayed screen. Similarly, a touch input may be received to switch from displaying one program (e.g., an e-mail application) to another program (e.g., a music player), and as a result the screen corresponding to the first program (the e-mail application) may shifted out of the viewing area to be replaced by the new screen corresponding to the second program (the music player). Because the touch inputs for executing both scenarios may be similar, and because the transition from one screen to the other in each scenario may have a similar visual appearance, the user may be confused as to whether the newly displayed screen is part of the original content with which the user was interacting (e.g., part of the content that was previously outside the viewing area) or represents new interactive content (e.g., a different program).

In addition, numerous screens may be available for access to the user from a particular origin screen. These available destination screens (e.g., screens to which the user can navigate from the origin screen) may in some cases provide interactive content related to the origin screen (e.g., by presenting information from the same program) or may provide different interactive content (e.g., by accessing a different program or functionality of the device). The decrease in the size of the viewing area may further make it undesirable to provide icons, buttons, or other obstructing indications of the available destination screens to the user, as such indications may overlay and prevent the user from seeing the origin screen that is being displayed.

Accordingly, embodiments of the present invention provide for transitions between screens that allow a user to select from multiple destination screens without necessarily obstructing the user's view of the origin screen with on-screen indications of the available destination screen. In addition, embodiments of the present invention provide for transitions between screens that indicate to the user that the user is "leaving" (e.g., transitioning away) from an origin screen and is "entering" (e.g., transitioning to) a destination screen. Embodiments of the present invention thus provide for a visual transition from an origin screen to a destination screen based on certain characteristics of the input received from the user. For example, upon receipt of an input such as a stroke gesture, the particular destination screen to be displayed in the place of the origin screen may be determined from a number of possible destination screens based on the position of the input and the direction of the stroke. Furthermore, a graphical effect applied to the origin screen to transition from the origin screen to the destination screen may be based on the position of the input, such that the visual transition has a different appearance based on how the stroke was applied to the display, as explained in greater detail below.

Thus, a transition from the origin screen to a destination screen is determined based on characteristics of the input received (e.g., the type of input received and/or how it is applied to the display) that creates for the user a visual transition from the origin screen to the destination screen and that, in some cases, helps the user understand that he or she is navigating from the display of a first interactive content to a display of a second, different interactive content (e.g., rather than navigating between different portions of the same interactive content) and, in other cases, provides the user with easy access to various screens from a single origin screen without significantly affecting the user's view of the origin screen.

Figure 1:
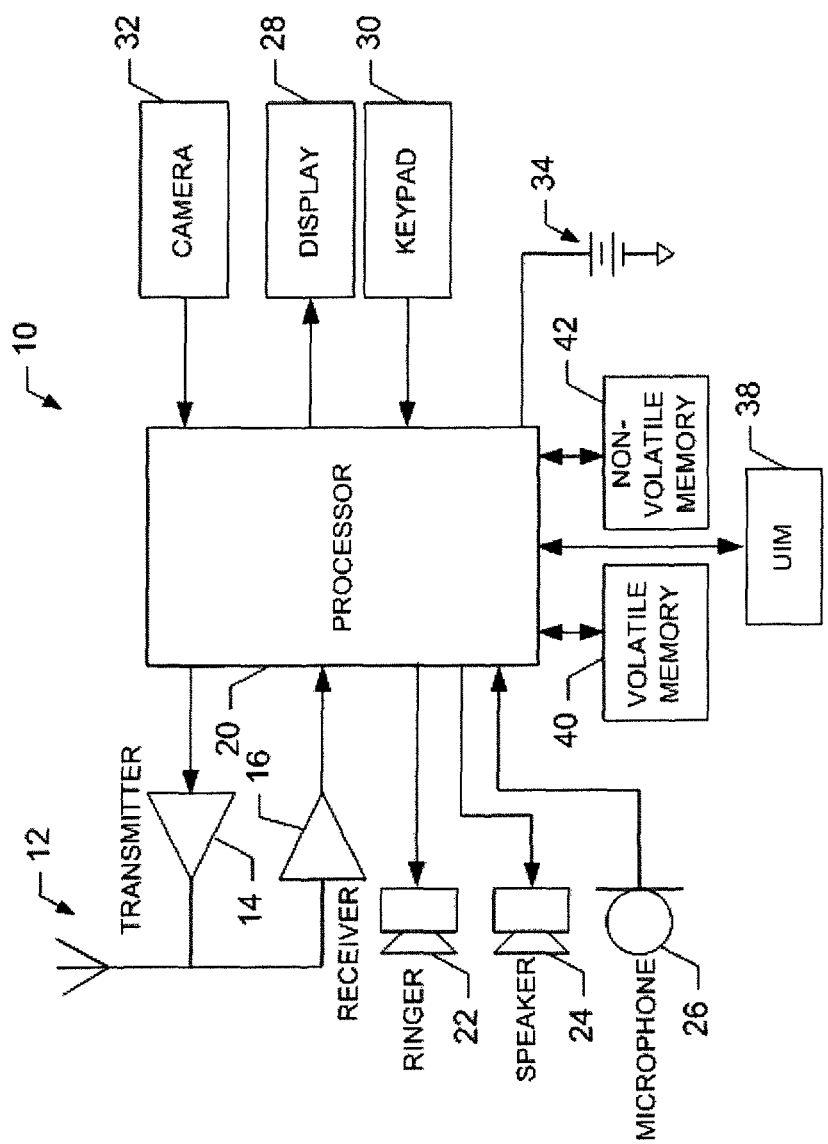
FIG. 1 illustrates one example of a communication system according to an example embodiment of the present invention.

FIG. 1, which provides one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include a proximity component and/or an orientation component, as described below. The signals may further include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element 32 in order to capture images or video of objects, people, and places proximate to the user of the mobile terminal 10. The mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for providing for transitions between screens. The apparatus 50 of FIG. 2 may be employed, for example, in conjunction with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer, a tablet, a mobile telephone, or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
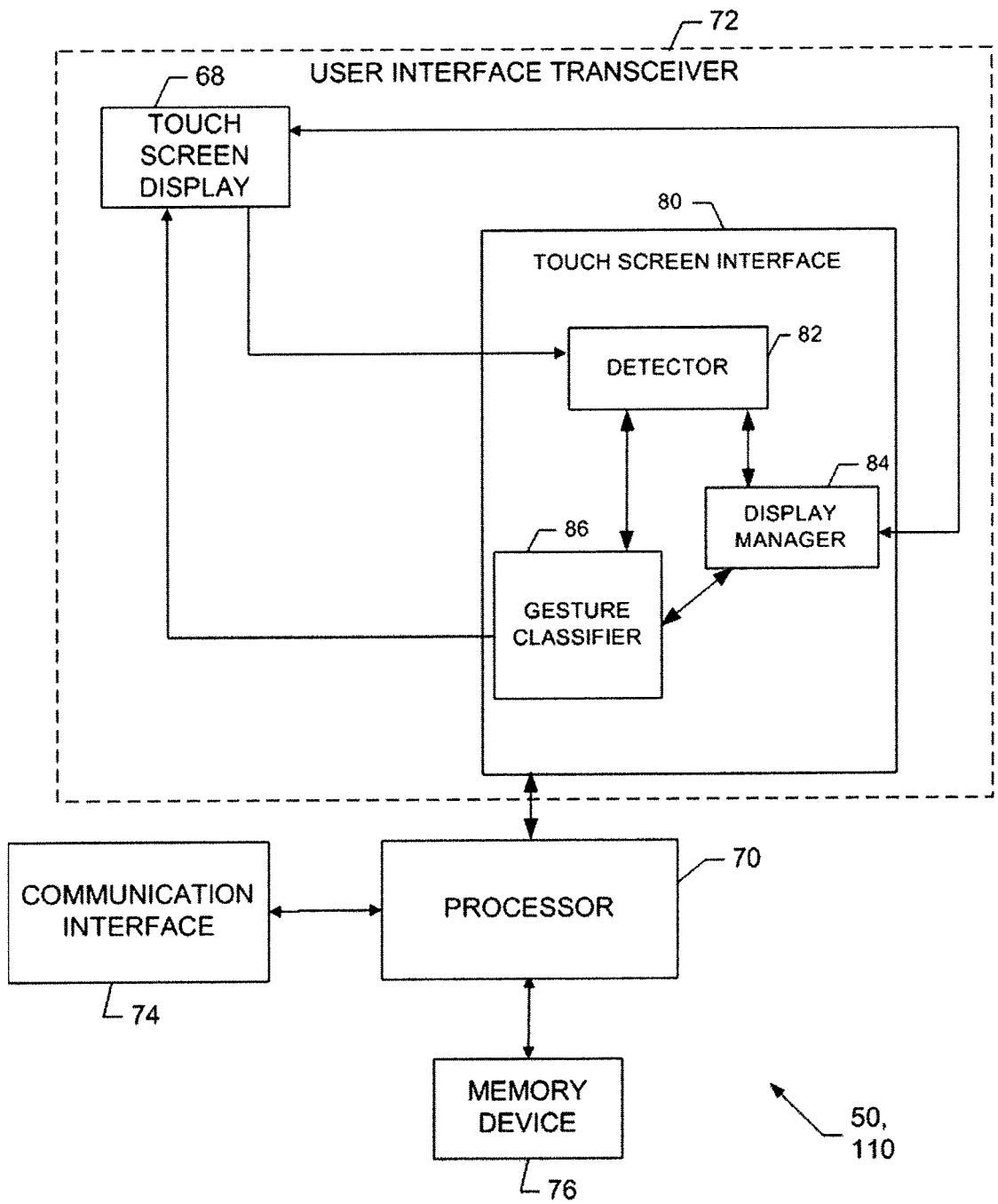
FIG. 2 illustrates a schematic block diagram of an apparatus for providing for a visual transition from an origin screen to a destination screen according to an example embodiment of the present invention.

It should also be noted that while FIG. 2 illustrates one example of a configuration of an apparatus for providing for transitions between screens, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 for providing for transitions between screens may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch screen display 68 to receive touch inputs at the touch screen display 68 and to analyze and/or modify a response to such indications based on corresponding user actions that may be inferred or otherwise determined responsive to the touch inputs.

With continued reference to FIG. 2, in an example embodiment, the apparatus 50 may include a touch screen interface 80. The touch screen interface 80 may, in some instances, be a portion of the user interface transceiver 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an input in the form of a touch event at the touch screen display 68. As such, the touch screen interface 80 may be in communication with the touch screen display 68 to receive user inputs at the touch screen display 68 and to modify a response to such inputs based on corresponding user actions that may be inferred or otherwise determined responsive to the inputs. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, and a gesture classifier 86. Each of the detector 82, the display manager 84, and the gesture classifier 86 may be any device or means embodied in either hardware or a combination of hardware and software configured to perform the corresponding functions associated with the detector 82, the display manager 84, and the gesture classifier 86, respectively, as described herein. In an exemplary embodiment, each of the detector 82, the display manager 84, and the gesture classifier 86 may be controlled by or otherwise embodied as the processor 70.

The detector 82 may be in communication with the touch screen display 68 to receive user inputs in order to recognize and/or determine a touch event based on each input received at the detector 82. A touch event may be defined as a detection of an object, such as a stylus, finger, pen, pencil, cellular telephone, digital camera, or any other mobile device (including the mobile terminal 10 shown in FIG. 1) or object, coming into contact with a portion of the touch screen display in a manner sufficient to register as a touch. In this regard, for example, a touch event could be a detection of pressure on the screen of the touch screen display 68 above a particular pressure threshold over a given area. Subsequent to each touch event, the detector 82 may be further configured to pass along the data corresponding to the touch event (e.g., location of touch, length of touch, number of objects touching, touch pressure, touch area, speed of movement, direction of movement, length of delay, frequency of touch, etc.) to the gesture classifier 86 for gesture classification. As such, the detector 82 may include or be in communication with one or more force sensors configured to measure the amount of touch pressure (e.g., force over a given area) applied as a result of a touch event, as an example.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, pinch event (e.g., a pinch in or pinch out), and/or the like.

A touch may be defined as a touch event that impacts a single area (without or with minimal movement on the surface of the touch screen display 68) and then is removed. A multi-touch may be defined as multiple touch events sensed concurrently (or nearly concurrently). A stroke may be defined as a touch event followed immediately by motion of the object initiating the touch event while the object remains in contact with the touch screen display 68. In other words, the stroke may be defined by motion following a touch event thereby forming a continuous, moving touch event defining a moving series of instantaneous touch positions (e.g., as a drag operation or as a flick operation). As such, a stroke 100 (shown in FIG. 3) may include a contact component A (e.g., initial contact with the touch screen display 68), a movement component (e.g., motion of the object contacting the touch screen display while the object remains in contact, represented by the arrow 100), with the direction of the movement component being the direction of motion of the object across the touch screen display. In some cases, the direction may be a nominal direction that is not identical to the direction of the movement component (e.g., a direction that is not the actual or instantaneous direction of the movement of the object across the touch screen display 68), as shown in FIG. 3 via the dashed arrow 105. Multiple strokes and/or touches may be used to define a particular shape or sequence of shapes to define a character or symbol.

A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other.

The gesture classifier 86 may also be configured to communicate detection information regarding the recognition, detection, and/or classification of a touch event to the display manager 84. The display manager 84 may be configured to provide control over modifications made to that which is displayed on the touch screen display 68 based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display (e.g., with respect to the content displayed and/or the user interface effects presented relative to the content displayed) according to the gesture classification and implementation characteristic classification determined for a given touch event that may be detected at the display.

Turning now to FIGS. 4A-8, in general, an apparatus 50 is provided, such as an apparatus embodied by the mobile terminal 10 of FIG. 1 (e.g., a cellular phone) that has or is otherwise associated with a touch screen display 68. As described above, the apparatus 50 may comprise at least one processor (e.g., processor 70 of FIG. 2) and at least one memory (e.g., memory device 76 of FIG. 2) including computer program code. The at least one memory and the computer program code may be configured to, with the processor, cause the apparatus 50 to at least provide for display of an origin screen 200. The origin screen 200 may, for example, represent a first interactive content, such as a home screen, a lock screen, or a screen associated with a particular program. The apparatus may be further caused to receive an input from a user comprising a movement component, such as a stroke 100 (FIG. 3). Although the embodiments depicted in the figures and used in the examples herein refer to a touch screen display 68 configured to receive touch inputs, the inputs may be provided to a non-touch display and/or via non-touch user input devices, such as a keypad or mouse. In this regard, the position of the non-touch input may refer to the location on the non-touch display corresponding to the location the input is applied (e.g., the position of an indicator, such as a mouse pointer), and the movement component of the input may be the motion of the indicator on the non-touch display, which, for example, is the result of a corresponding motion of a mouse on a horizontal surface, with the direction of the movement component being the direction of motion of the indicator across the non-touch display.

A destination screen 300 may be determined for display from among a plurality of screens based on a position of the input and a direction of the movement component of the input. The apparatus may then be caused to provide for a visual transition from the origin screen 200 to the destination screen. In this regard, the terms "origin" and "destination" are not necessarily used to identify a screen providing particular content. Rather, the term "origin" refers to any screen that the user is currently viewing, and the term "destination" refers to any of a number of screens that the user wishes to display (e.g., a new screen), which may, for example, take the place of the origin screen. Thus, a particular screen, such as a listing of contacts in a phone program, may be considered the origin screen in one scenario in which the user is viewing the contact list screen, and the detailed summary of one of the contacts that the user wishes to display by selecting a particular contact may be considered a destination screen. Once the user has navigated to the detailed summary of the selected contact, however, the detailed summary screen may be considered the origin screen, and the contact list screen that the user may wish to return to may, in this case, be considered the destination screen. Thus, the designation of a screen as an origin screen or a destination screen depends on the particular user scenario.

Accordingly, the apparatus 50 is configured to determine which destination screen to display to the user based on where the input is received on the display and the direction of the movement component of the input (e.g., a stroke from right to left versus a stroke from left to right). The origin screen 200 may, for example, define at least a first area 210 and a second area 220. The first area 210 may be associated with a first screen for display (e.g., one particular destination screen), whereas the second area 220 may be associated with a second screen for display (e.g., a different destination screen). The first area 210 may be, for example, an area within a certain distance from a top edge 215 of the viewing area 120 of the display, and the second area 220 may be an area within a certain distance from a bottom edge 225 of the viewing area. In other cases, however, the first and second areas 210, 220 may be areas proximate the left and right side edges of the display, or they may be areas closer to the center of the origin screen. The first and second areas 210, 220 may, in some cases, be limited in size (e.g., approximately 2-4 mm wide), whereas in other cases the first and second areas may extend from a respective edge of the viewing area 120 up to almost the center of the viewing area, such that, for example, almost the entire top half of the viewing area would be considered the first area and almost the entire bottom half of the viewing area would be considered the second area.

Figure 6B:
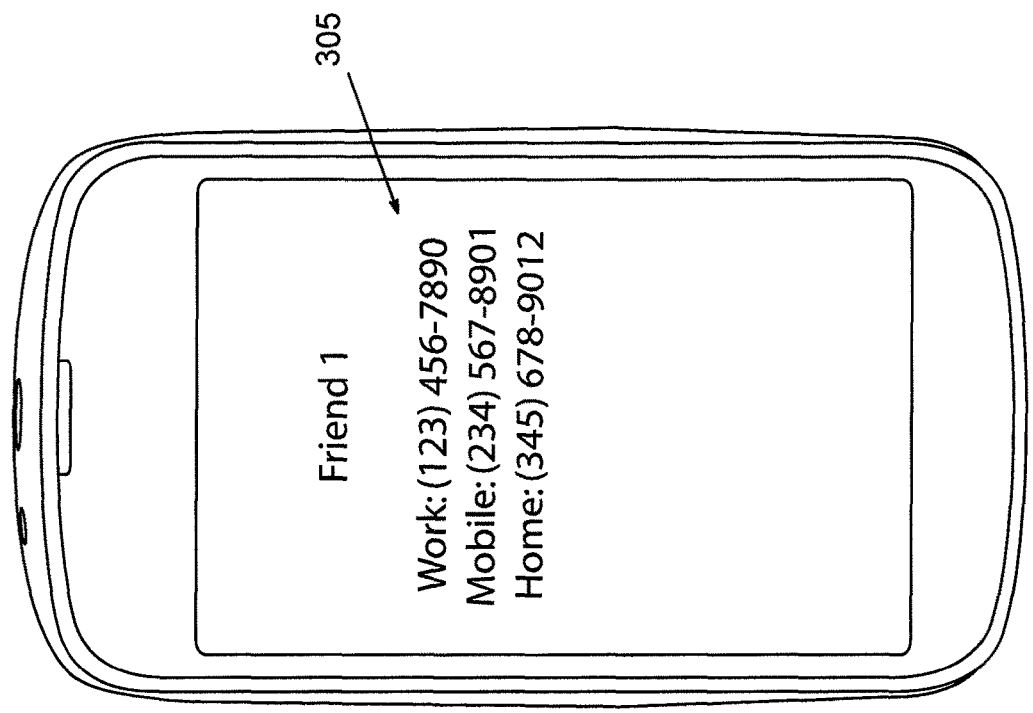
FIGS. 6A-6B illustrate a visual transition from an origin screen to a third screen according to an example embodiment of the present invention.
Figure 6A:
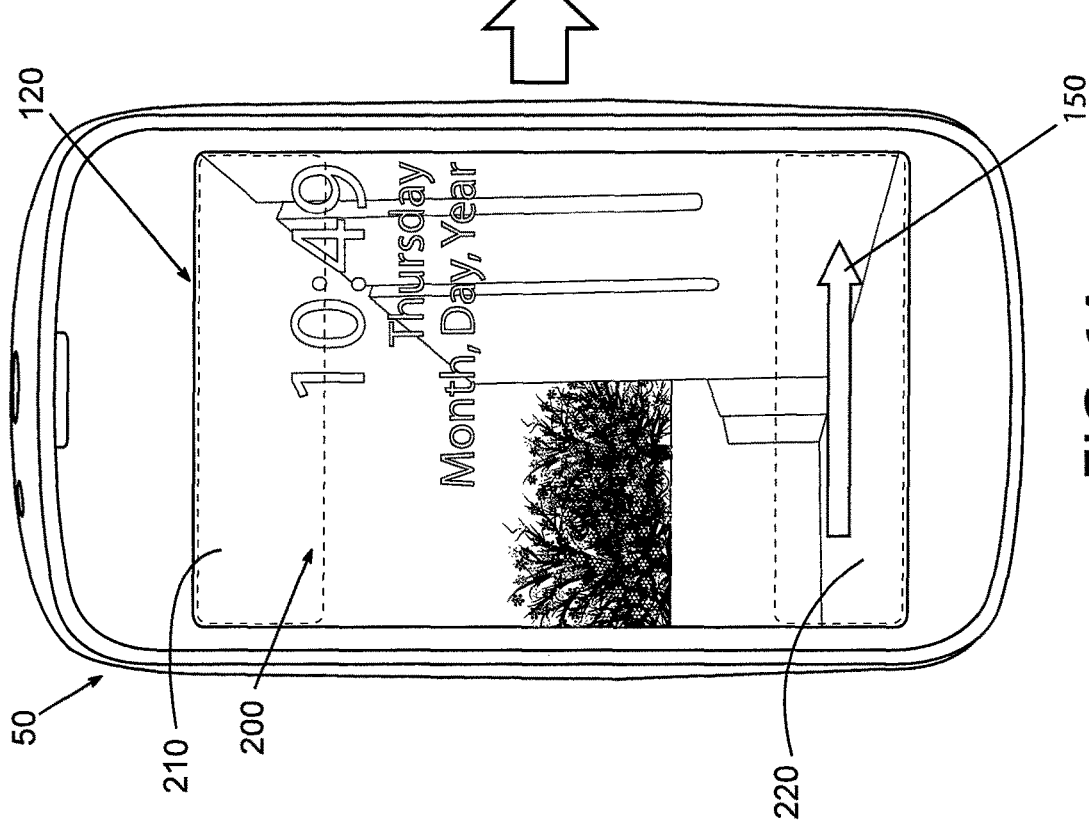
Figure 7:
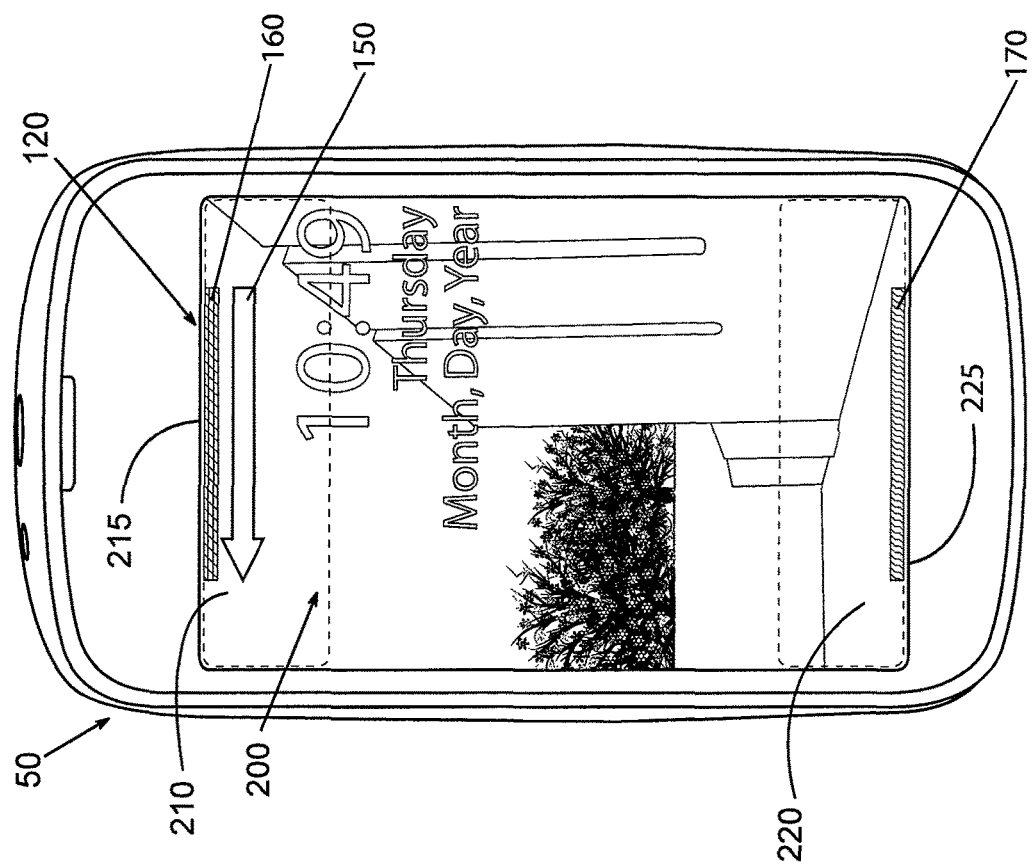
FIG. 7 illustrates an origin screen that includes an indication of an association of a first area with a first screen and a second area with a second screen according to an example embodiment of the present invention.

The at least one memory and the computer program code may thus be configured to, with the processor, cause the apparatus to determine a first screen 300' for display based on the position of the input 150 being within the first area 210 and to determine a second screen 305 for display based on the position of the input being within the second area 220. For example, in FIG. 4A, in which the origin screen 200 (e.g., an idle screen) is displayed, a stroke 150 from left to right received in the first area 210 may cause the first screen 300 (e.g., a Contacts List) to be displayed in FIG. 4B. In FIGS. 6A and 6B, however, a stroke from left to right received in the second area 220 may cause the second screen 305 (e.g., details for a particular contact, such as the last accessed contact) to be displayed (FIG. 6B).

In some embodiments, a particular direction of the movement component (e.g., a particular nominal direct such as right to left, as shown in FIGS. 4A and 6A) may be considered as invoking the destination screen, whereas a different direction of the movement component (e.g., left to right) may be disregarded or not considered input for the purposes of invoking the destination screen. In other embodiments, however, such as shown in FIGS. 5A and 5B, the at least one memory and the computer program code may be further configured to, with the processor, cause the apparatus to determine a first screen 300 for display based on the direction of the movement component being a first direction and to determine a second screen (e.g., a home screen 308) for display based on the direction of the movement component being a second, different direction, as shown in FIG. 5A. Thus, in this example, whereas movement of the user input from left to right in the first depicted scenario (FIG. 4A) may cause the apparatus to display a list of contacts (FIG. 4B), movement of the user input from right to left in the scenario shown in FIG. 5A may cause the apparatus to display a home screen (FIG. 6B).

Thus, in some cases, multiple destination screens may be invokable by the user based on the position of the input and the direction of the movement component. Considering the example of FIGS. 4A-6B, in which the origin screen defines at least a first area 210 and a second area 220, the at least one memory and the computer program code may be further configured to, with the processor, cause the apparatus to determine a first screen 300' for display based on the direction of the movement component being a first direction and based on the position of the input 150 being within the first area (FIGS. 4A and 4B). The apparatus may likewise be caused to determine a second screen (in this example, screen 308) for display based on the direction of the movement component being a second direction and based on the position of the input 150 being within the first area (FIGS. 5A and 5B). In some cases, as shown in FIGS. 6A and 6B, the third screen (in this example, screen 305) for display may be determined based on the position of the input being within the second area (e.g., irrespective of the direction of the input, as long as the input has a movement component and is therefore associated with a direction). In still other cases, however, additional destination screens may be accessed by associating each area (e.g., first and second areas 210, 220 and/or third and fourth areas, not shown) with multiple destination screens based on the direction of the movement component of the input (e.g., left to right, right to left, top to bottom, diagonally up and to the right, etc.). The number of destination screens and the combination of position and direction of the movement component of the input that may be used to access each screen may be determined keeping user preferences and the general ease of use of the apparatus in mind, e.g., to avoid complicating functions or confusing the user and to minimize having the user access destination screens in error.

In FIGS. 4A-6B, the first and second areas 210, 220 are shown in dashed lines for ease of explanation; however, the user may not have any indication in these scenarios of the location and/or extent of the first and second areas. In other embodiments, though, the at least one memory and the computer program code may be further configured to, with the processor, cause the apparatus to provide an indication on the origin screen 200 of an association of the first area 210 with the first screen 300 and an association of the second area 220 with a second screen (e.g., screens 305 or 308), respectively. For example, referring to FIG. 7, a first indication 160 may be provided in the first area 210, such as in the form of a thin bar proximate the top edge 215 of the viewing area 120, while a second indication 170 may be provided in the second area 220, such as in the form of a different, thin bar proximate the bottom edge 225 of the viewing area 120. Thus, an input received within a certain proximity (e.g., a predetermined distance) of the respective indication may cause the associated screen to be invoked. In this way, the user may have some visual indication of the locations in which the input should be received, while at the same time the user's view of the origin screen may not be unduly affected. Other indications may be provided instead of the thin bars depicted in FIG. 7, such as a different coloring of the origin screen (such as a color gradient or an opacity that is applied at or in a portion of the respective areas).

Figure 8:
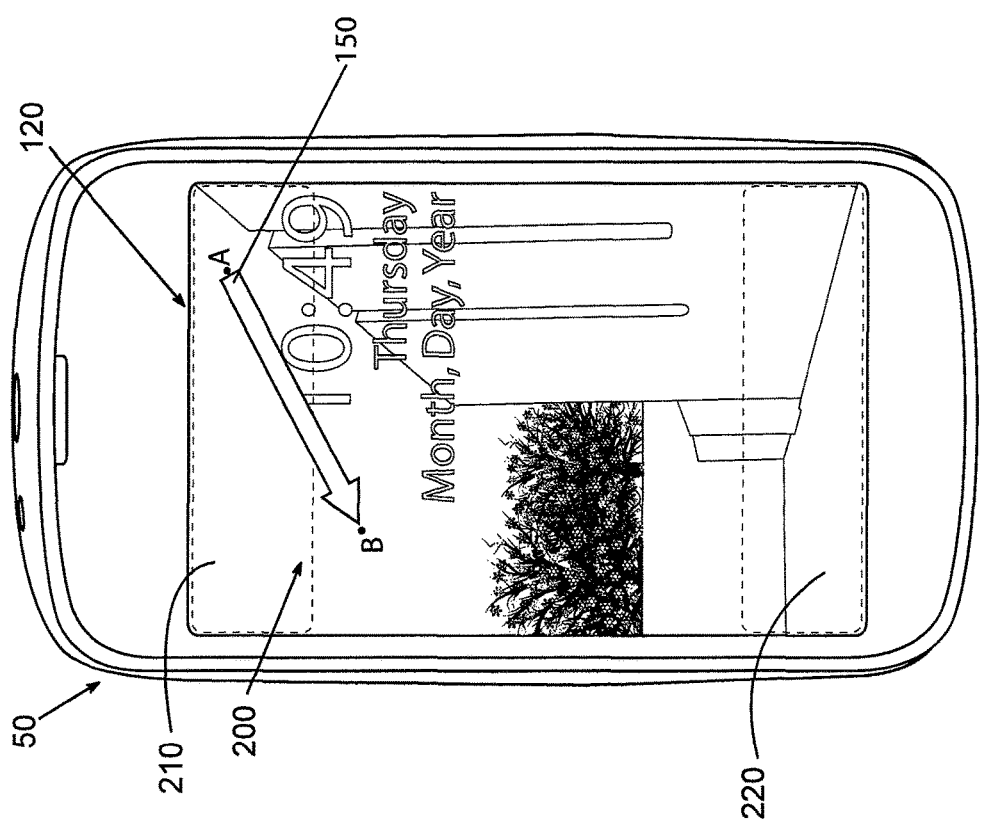
FIG. 8 illustrates an input applied to an origin screen, where a portion of the input is received within the first area according to an example embodiment of the present invention.

In some embodiments, the at least one memory and the computer program code may be configured to, with the processor, cause the apparatus to determine the destination screen 300 for display based on an initial contact position of the input 150. With reference to FIG. 8, for example, a user's input gesture, e.g., in the form of a stroke 150, may not necessarily be horizontally applied with respect to the viewing area 120. The user may make initial contact with the touch screen display at position A, may move his or her finger from position A to position B along the line shown, and may break contact with the display at position B. The initial contact position A may, in some cases, be slightly below or slightly above (as shown) the terminal contact position B, and in some instances the stroke gesture 150 may move outside the first area 210, for example, in the process of going from point A to point B. Thus, as noted above, the apparatus in some embodiments may be configured to determine the destination screen 300 for display based on the initial contact position A of the input 150. In other words, even if the terminal contact position B is outside the first area 210 for receiving input (as shown in FIG. 8), the associated destination screen 300 may nonetheless be invoked because the initial contact position A was within the first area. In other cases, however, the entire input 150 must be received within the first area so as to invoke the associated screen.

As noted above and described through the examples, in some cases the origin screen may represent a first interactive content, and the destination screen may represent a second interactive content. As used herein, the term "interactive content" refers to information presented to the user via the display 68 (FIG. 2) or the display 28 (FIG. 1), either graphical (such as using icons, photos, illustrations, etc.) or textual, with which the user may interact in a particular way for a particular purpose. For example, as shown in the examples depicted in FIGS. 4A, 5A, and 6A, the first interactive content may include information that is presented to the user as part of an idle screen, such as the current time, the day of the week, the date, and a background image. The first interactive content may be configured such that the user can only interact with the content in a very limited manner, such as by shifting the content over to one side to change the state of the apparatus from idle to active (e.g. to access a destination screen). Thus, the purpose of the first interactive content may be to provide certain information to the user (e.g., providing time and date information to the user) and to guard against the accidental entry of user input, such as through the user's incidental and unintentional contact with the display 68.

Continuing this example, the second interactive content (shown in FIGS. 4B, 5B, and 6B) may include data such as a contact list (FIG. 4B); summary of recent activities undertaken by the user via the device (e.g., music played or available), the current weather, recent phone calls, and/or a list of programs that may be launched by the user (FIG. 5B); or details pertaining to a particular contact (FIG. 6B). The second interactive content may be configured such that the user can more fully interact with the content, such as by selecting an icon to launch a program, expanding a displayed item to access details or further information, modify device settings, etc. Thus, the purpose of the second interactive content in this case may be to receive input from the user and to execute certain operations based on the input received.

Accordingly, in some cases, the first interactive content may comprise different information than the second interactive content. The second interactive content may, for example, include additional information as compared to the first interactive content, such as icons 310 for launching a program to play music, an indication of battery life 320, and an indication of the current weather 330 (as depicted in FIG. 5B).

Alternatively or additionally, the first interactive content may be configured to allow the user to interact with the first interactive content according to a first set of rules, and the second interactive content may be configured to allow the user to interact with the second interactive content according to a second set of rules. With reference to FIG. 4A, for example, the origin screen 200 may be configured such that only a stroke touch event received in a first or second area 210, 220 that includes a movement component having a particular direction is registered as an input that causes a certain destination screen to be accessed and displayed. Other inputs that do not satisfy these criteria, such as a simple touch, multi-touch, pinch, tap, press, or long press (among others) would not be recognized as inputs and would be disregarded by the apparatus. Similarly, the destination screen 300 (FIG. 4B) may be configured such that only touch events received at certain locations (e.g., corresponding to the location of a particular contact's name) of the touch screen display are registered as inputs. Moreover, the operation executed upon receipt of the input may depend on the location at which the touch event is received (which contact to call). Thus, a touch event in a blank area of the screen, for example, may not cause any operation to be executed.

In other cases, however, a destination screen may be accessed that does not contain different interactive content with respect to the origin screen. For example, a user transitioning between the screen 300 shown in FIG. 4B and the screen 305 shown in FIG. 6B would be going from an origin screen display a first interactive content to a destination screen displaying content related to the first interactive content, in that the content from both screens was generated by, for example, the same program (e.g., a contacts application).

Figure 9B:
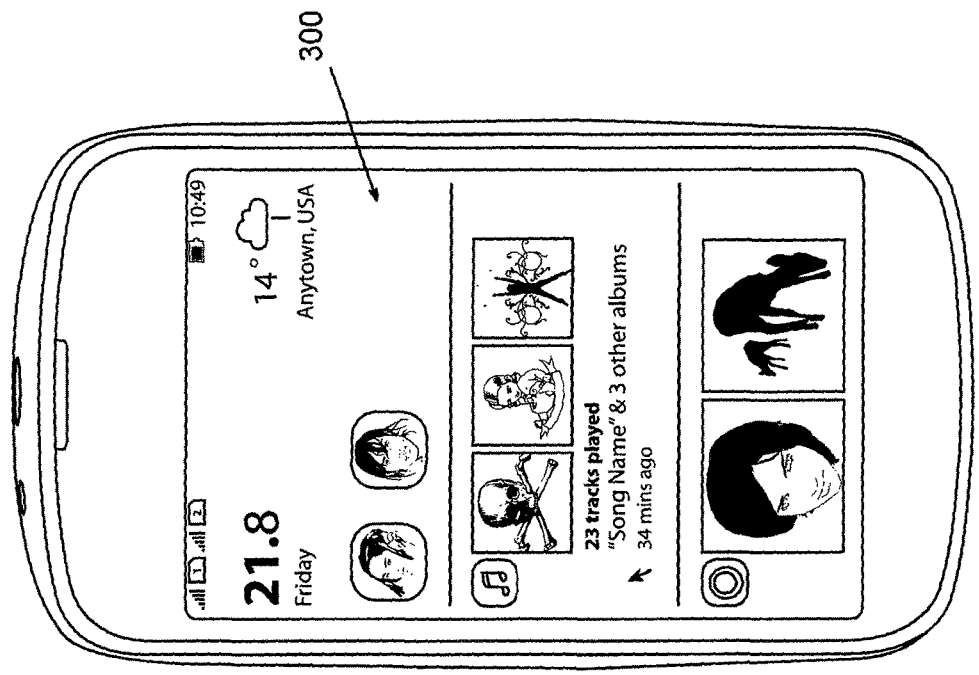
FIGS. 9A-9B illustrate an origin screen that is a lock screen according to an example embodiment of the present invention.
Figure 9A:
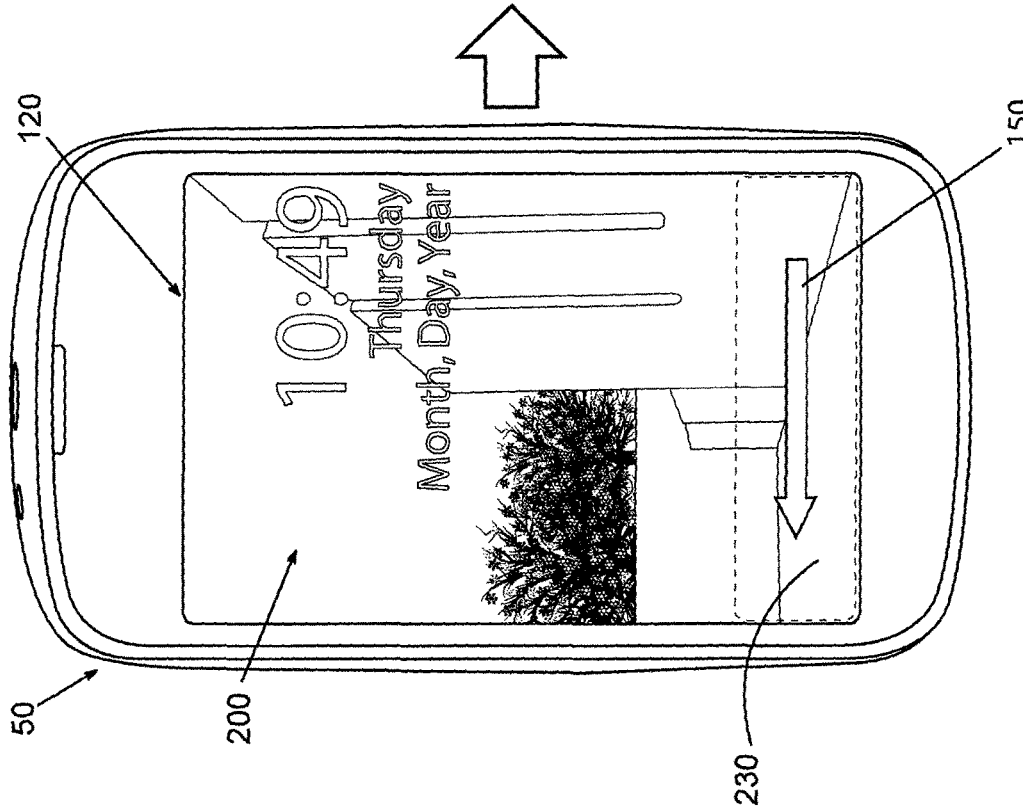

Accordingly, in some embodiments, the origin screen may be a lock screen (e.g., shown in FIGS. 4A, 5A, and 6A), and the at least one memory and the computer program code may be further configured to, with the processor, cause the apparatus to unlock the screen upon receipt of the input based on at least one of the position of the input and the direction of the movement component of the input. For example, as shown in FIG. 9A, the origin screen 200 may be a lock screen, and the origin screen may define a single user input area 230 for receiving input 150. In some cases, the apparatus may only be caused to unlock the screen upon receipt of the input 150 based on the position of the input being within the user input area 230 (e.g., proximate the bottom edge of the viewing area 120) and based on the direction of the movement component of the input being from right to left, as shown. All other input received via the lock screen may be disregarded, and the screen may remain locked until the proper input is received.

As described above and depicted in the figures, the particular arrangement and presentation of interactive content (whether the same or different interactive content) is described herein as being provided via "screens" that are displayed to the user upon the display 68 of the apparatus. In other words, each screen presents to the user a collection of content elements that make up the respective interactive content. In FIG. 4A, for example, the displayed time (10:49) is a content element of the first screen 200 and is part of the first interactive content.

In some embodiments, the apparatus may provide for a visual transition from the origin screen to the destination screen by applying a graphical effect to the origin screen (e.g., in response to receipt of a user's touch input to a particular area of the screen) and, as a result, applying the graphical effect to all of the interactive content represented on the respective screen. Thus, for example, panning of a screen to the left via a stroke touch event may serve to shift all of the first interactive content displayed on the respective screen to the left, including content that may not have been directly contacted by the user's touch input (stroke).

Referring now to FIG. 10A-12C, an apparatus 50 may be provided comprising at least one processor and at least one memory including computer program code, the at least one memory and the computer program code configured to, with the processor, cause the apparatus to at least provide for display of an origin screen 200 within a viewing area 120, where the origin screen represents a first interactive content and where the origin screen defines a reference point R (identified for explanation purposes in the figures as a solid "+"). The apparatus may be further caused to receive an input from a user comprising a movement component, such as a stroke 150 as described above. In response to the input, the apparatus may be caused to provide for a visual transition from the origin screen 200 to a destination screen 300 representing a second, different interactive content by applying a graphical effect to the display of the origin screen.

The graphical effect may comprise a translation aspect 250 (shown in FIGS. 10B and 10C) so as to cause the origin screen 200 to move along an axis H with respect to the viewing area 120. For example, the translation aspect 250 may comprise a translation of the reference point R across the viewing area as the visual transition occurs, illustrated by a horizontal distance d traversed by the reference point R from the original location of the reference point (shown as an outlined "+") to the instantaneous location of the reference point. The graphical effect may further comprise a rotational aspect 255 so as to cause the origin screen 200 to rotate about the reference point R, shown in FIG. 10B. In this way, the graphical effect may simulate a physical response of the origin screen to the input based on at least one of a position of the input 150 with respect to the reference point R, a speed of the movement component of the input, and a direction of the movement component of the input. In other words, the graphical effect may treat the origin screen 200 as a physical object having a particular mass and with a surface having a particular coefficient of friction that is physically placed on top of the destination screen 300 (e.g., similar to a playing card or a sheet of paper). Characteristics of the input 150 received (e.g., position, speed, direction) may be used (e.g., as variables in an algorithm modeling how the physical object would react) to determine the movement of the origin screen 200 across the viewing area 120 in response to the input if the origin screen 200 was a physical object and the input was a physical input applied to the object. The graphical effect may thus simulate the behavior of the origin screen 200 under the "force" of the input, similar to would occur in the physical world.

Figures 10A, 10B:
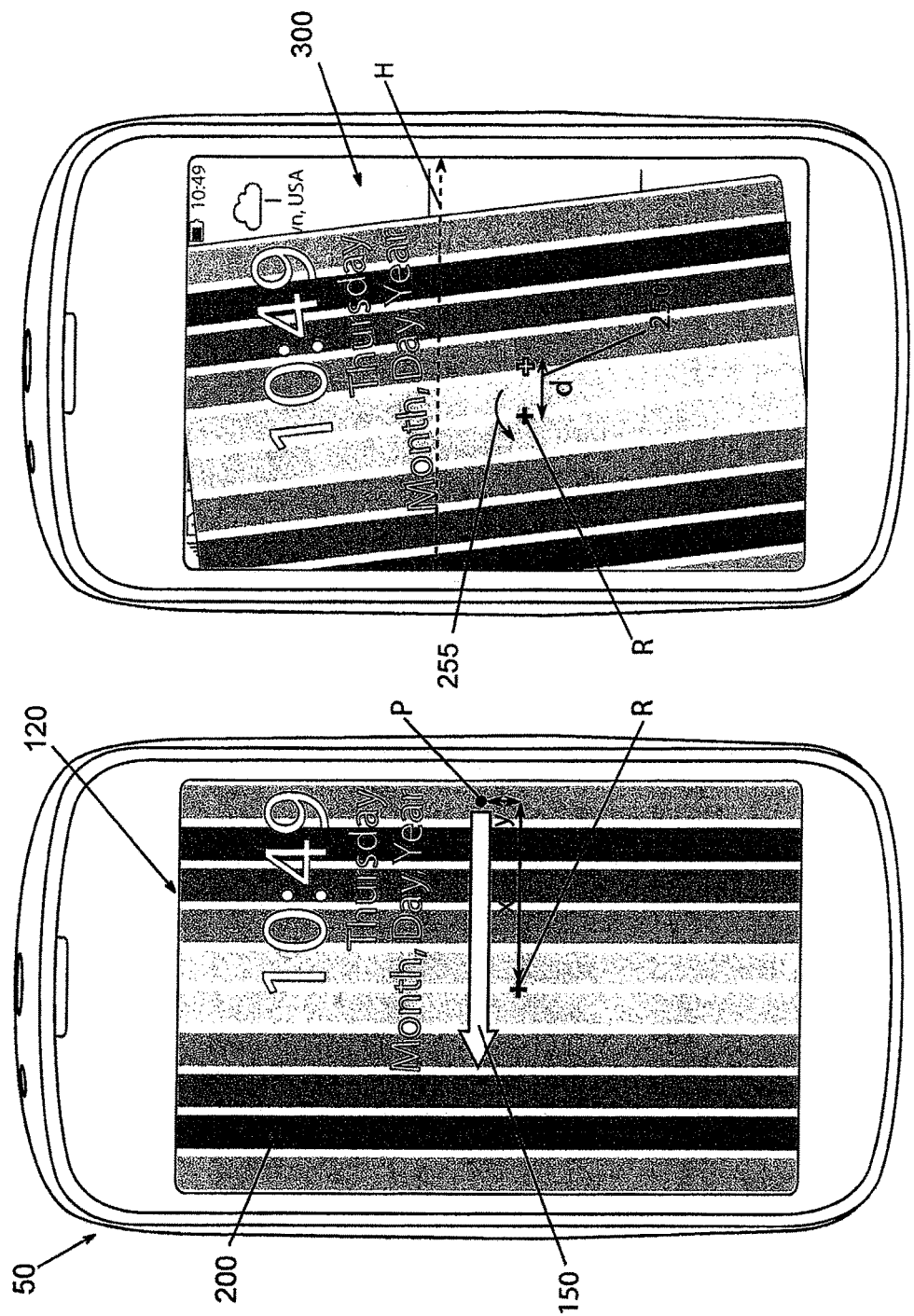
Figure 11C:
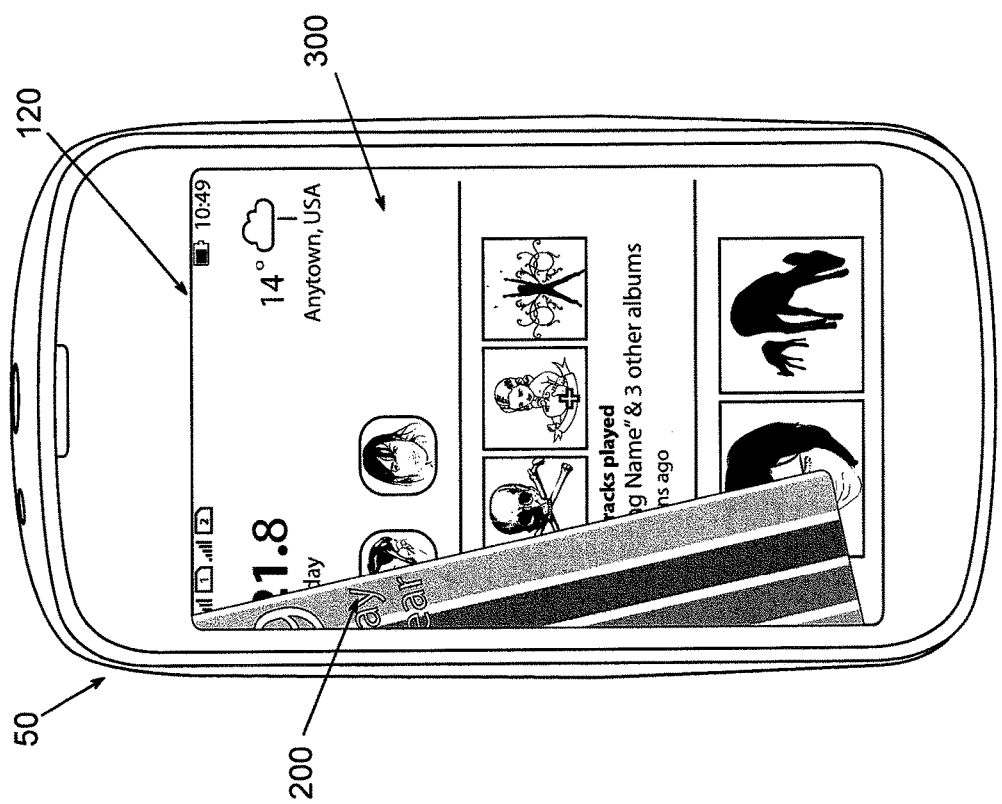

Thus, an input 150 received near the center of the origin screen 200 and above the reference point R, as shown in FIG. 10A, may result in a visual transition as illustrated in FIGS. 10A-10E. An input received near an upper part of the origin screen 200 may result in the same visual transition (shown in FIGS. 11A-11C) or a different visual transition (e.g., having a larger angle of rotation), and an input received below the reference point R (shown in FIGS. 12A-12C) may rotated the origin screen 200 in a direction opposite that shown in FIGS. 10A-11C.

Depending on the particular algorithms or equations used to model the effect of a physical input to a physical representation of the origin screen, as well as the constants and coefficients chosen, the graphical effect may be configured to provide for different visual transitions from the origin screen 200 to the destination screen 300. For example, the translation aspect 250 of the graphical effect may comprise movement along the axis H in a direction that is substantially the same as a direction of the movement component of the input 150. In FIGS. 10A-12C, for example, the direction of the movement component is generally from right to left, and the translation aspect 250 of the graphical effect is generally from right to left. In other embodiments, however, the input 150 may be applied diagonally (e.g., upper right to lower left), and the origin screen 200 may be translated along a similar direction as a result. In yet other embodiments, the input 150 may be applied from top to bottom with respect to the viewing area 120, and the translation aspect of the graphical effect may be in a direction general from top to bottom, as well.

In some cases, the translation aspect 250 of the graphical effect may be proportional to the movement component of the input. Thus, as the user applies a stroke gesture 150 to the touch screen display, the origin screen 200 may be translated at a speed that is proportional to the speed at which the input was applied by the user. Moreover, the user may, in some cases, reverse the visual transition by reversing the direction of the stroke gesture if the stroke gesture has not yet been completed (e.g., the user's finger is still contacting the touch screen display). Thus, the translation (and/or rotation) of the origin screen 200 may likewise be reversed, moving the origin screen back to its original position with respect to the viewing area 120, at a speed that is proportional to the speed of the reverse stroke gesture. In other cases, however, the graphical effect may be automatically applied to the origin screen 200 upon receipt of at least a portion of the stroke gesture (e.g., may not be controllable by the user), such that the stroke gesture in this example could not be reversed once initiated.

The rotational aspect 255 of the graphical effect may, in some embodiments, define an angle of rotation α, shown in FIG. 10D, for example. The at least one memory and the computer program code may be further configured to, with the processor, cause the apparatus to determine the angle of rotation α based at least in part on an initial position P of receipt of the input with respect to the reference point R. For example, with reference to FIG. 10A, the input 150 may have an initial point of contact P defined with respect to the reference point R by a horizontal distance x and a vertical distance y. The x and y distances may be used (e.g., as inputs to an algorithm) to determine the angle of rotation α of the origin screen 200. Thus, the angle of rotation α of the origin screen 200 may be pre-set based on the initial point of contact P, regardless of the subsequent path of the stroke 150 received.

In other cases, however, the at least one memory and the computer program code may be further configured to, with the processor, cause the apparatus to determine the angle of rotation α based at least in part on an instantaneous position of receipt of the input 150 with respect to the reference point R. Accordingly, the angle of rotation α may vary as the instantaneous position of the receipt of the input 150 varies. For example, if the user's input is initially received at the location P shown in FIG. 10A, the angle of rotation α may initially have one value, but the value may be adjusted up or down based on the path of the user's input (e.g., generally horizontal, as shown in FIG. 10A, or something other than horizontal, as shown in FIG. 8). By responding to the instantaneous position of the user's input 150, the apparatus may apply a graphical effect that more closely resembles the reaction of the origin screen 200 as a physical object.

In still other embodiments, the at least one memory and the computer program code may be further configured to, with the processor, cause the apparatus to determine the angle of rotation α based at least in part on a speed of the movement component of the input. For example, an input 150 illustrated in FIG. 10A that involves a contact component with a duration of 1 second (e.g., the user's finger maintains contact with the screen from the initial point of contact to release for 1 second) may result in a greater angle of rotation α than an input having identical points of contact but involving a touch component with a duration of 3 seconds. This type of time-dependent response may, for example, simulate a rotational acceleration that would be imparted on the origin screen 200 as a physical object by a "faster" applied force.

Moreover, the translation and rotational aspects 250, 255 may be applied simultaneously or substantially simultaneously, consecutively, or using some combination of simultaneously and consecutively. For example, upon receipt of the input 150, both the translation and rotational aspects 250, 255 of the graphical effect may be applied up until the origin screen 200 has been rotated through a maximum angle of rotation, such as the angle of rotation α described above (e.g., from FIG. 10A to FIG. 10D). At that point, the rotational aspect 255 of the graphical effect may cease, and only the translation aspect 250 may continue until the origin screen 200 has been moved outside of the viewing area 120 to reveal the destination screen 300. In other cases, the rotational aspect 255 may be applied first until the angle of rotation α has been achieved, and then the translation aspect 250 may be applied. In still other cases, both the translation aspect 250 and the rotational aspect 255 may be applied at substantially the same time, such that the origin screen 200 is both rotating and translating from the time the input 150 is received until the origin screen has been moved outside the viewing area 120.

Although the reference point R in FIGS. 10A-12C is shown as being in a central location of the origin screen 200, the apparatus may be configured such that the reference point is located elsewhere on the origin screen, such as the center of the bottom edge of the origin screen, the bottom left corner, the bottom right corner, etc. Regardless of the location of the reference point R or the particular algorithmic model or constants/coefficients used, the graphical effect may be configured to simulate a physical property of the origin screen 200, such that the origin screen appears to react to the input in the same way that a physical object would react. In this way, the user may be more likely to understand the visual transition from the origin screen 200 to the destination screen 300 is a transition between two distinct screens, e.g., screens comprising different interactive content as described above. Moreover, because the screen simulates a reaction similar to that of a physical object in response to the user's input, the user may be more likely to remember the input so as to transition between screens when necessary, as the visual transition provided can be related in the user's mind to a transition between physical objects (e.g., playing cards) in the real world. Thus the amount of time a user must expend to learn the input may be decreased.

FIGS. 13 and 14 illustrate flowcharts of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one embodiment of a method for providing transitions between screens, as shown in FIG. 13, includes providing for display of an origin screen at Block 400, receiving an input from a user comprising a movement component at Block 410, determining a destination screen for display from a plurality of screens based on a position of the input and a direction of the movement component of the input at Block 420, and providing for a visual transition from the origin screen to the destination screen at Block 430. In some cases, the origin screen may define at least a first area and a second area, as described above. A first screen may be determined for display as the destination screen based on the position of the input being within the first area, and a second screen may be determined for display based on the position of the input being within the second area, at Block 440. An indication may be provided on the origin screen of an association of the first area with the first screen and an association of the second area with the second screen, respectively, at Block 450. In other cases, determining the destination screen at Block 420 may comprise determining a first screen for display based on the direction of the movement component being a first direction and determining a second screen for display based on the direction of the movement component being a second, different direction at Block 460.

In some embodiments, the origin screen may define at least a first area and a second area, as described above, and determining the destination screen may comprise determining a first screen for display based on the direction of the movement component being a first direction and based on the position of the input being within the first area; determining a second screen for display based on the direction of the movement component being a second direction and based on the position of the input being within the first area; and determining a third screen for display based on the position of the input being within the second area. Moreover, the destination screen for display may be determined based on an initial contact position of the input, as described above.

In some cases, determining the destination screen for display may comprise determining the destination screen for display based on an initial contact position of the input. The origin screen may, for example, represent a first interactive content, and the destination screen may represent a second interactive content. The origin screen may, for example, be a lock screen, and determining the destination screen may comprise unlocking the lock screen upon receipt of the input based on at least one of the position of the input and the direction of the movement component.

Turning now to FIG. 14, another embodiment of a method for providing transitions between screens is shown, which includes providing for display of an origin screen within a viewing area at Block 500, where the origin screen represents a first interactive content and where the origin screen defines a reference point. Input may be received from a user at Block 510 comprising a movement component, and a visual transition from the origin screen to a destination screen representing a second, different interactive content may be provided for in response to the input by applying a graphical effect to the display of the origin screen at Block 520. The graphical effect may comprise a translation aspect so as to cause the origin screen to move along an axis with respect to the viewing area, and the graphical effect further comprises a rotational aspect so as to cause the origin screen to rotate about the reference point. Thus, the graphical effect may simulate a physical response of the origin screen to the input based on at least one of a position of the input with respect to the reference point, a speed of the movement component of the input, and a direction of the movement component of the input, as described above.

In some cases, the translation aspect of the graphical effect may comprise movement along the axis in a direction that is substantially the same as a direction of the movement component of the input. The translation aspect of the graphical effect may, in addition or alternatively, be proportional to the movement component of the input.

In some embodiments, the rotational aspect of the graphical effect may define an angle of rotation, and the angle of rotation may be determined based at least in part on a position of receipt of the input with respect to the reference point at Block 530. For example, the angle of rotation may be determined based at least in part on an initial position of receipt of the input with respect to the reference point, or the angle of rotation may be determined based at least in part on an instantaneous position of receipt of the input with respect to the reference point such that the angle of rotation varies as the instantaneous position of the receipt of the input varies. In other cases, the angle of rotation may be determined based at least in part on a speed of the movement component of the input at Block 540.

In some embodiments, certain ones of the operations above may be modified or further amplified as described below. Furthermore, in some embodiments, additional optional operations may be included, some examples of which are shown in dashed lines in FIGS. 13 and 14. Modifications, additions, or amplifications to the operations above may be performed in any order and in any combination.

In an example embodiment, an apparatus for performing the methods of FIGS. 13 and 14 above may comprise a processor (e.g., the processor 70 of FIG. 2) configured to perform some or each of the operations (400-540) described above. The processor may, for example, be configured to perform the operations (400-540) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operations 400, 420, 440-460, 500, 530, and 540 may comprise, for example, the user interface transceiver 72, the communication interface 74, the processor 70, the memory device 76, and/or a device or circuit for executing instructions or executing an algorithm for processing information as described above. Examples of means for performing operations 410 and 510 may comprise, for example, the user interface transceiver 72, the processor 70, the memory device 76, and/or a device or circuit for executing instructions or executing an algorithm for processing information as described above. Examples of means for performing operations 430 and 520 may comprise, for example, the user interface transceiver 72, the processor 70, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   provide for display of an origin screen, wherein the origin screen comprises an arrangement of a plurality of first content items over an area of a device display;
   receive an input from a user in one of a first predefined area or a second predefined area of the origin screen, wherein the input comprises a movement component;
   determine a directional relationship of the movement component relative to a reference point, the directional relationship being either a first directional relationship with the reference point or a second directional relationship with the reference point;
   in an instance it is determined the movement component comprises the first directional relationship with the reference point:
      (a) determine a destination screen for display from a plurality of screens based on which of the first or second predefined areas in which the input is received, wherein the destination screen comprises an arrangement of a plurality of second content items over the area of the device display and the second content items are different from the first content items; and
      (b) provide for a visual transition from the origin screen to the destination screen, wherein, as a result of the visual transition, the plurality of first content items of the origin screen are no longer displayed on the device display and are replaced by the plurality of second content items such that the destination screen replaces the origin screen as a result of the visual transition and is presented for viewing in the area of the device display in place of the origin screen that was previously presented in the area; and
   in an instance it is determined the movement component comprises the second directional relationship with the reference point, disregard the input for a purpose of transitioning from the origin screen to the destination screen.

2. The apparatus of claim 1, wherein the at least one memory and the computer program code are further configured to, with the processor, cause the apparatus to provide an indication on the origin screen of an association of the first predefined area with a first destination screen and an association of the second predefined area with a second destination screen, respectively.

3. The apparatus of claim 1, wherein the at least one memory and the computer program code are further configured to, with the processor, cause the apparatus to determine the destination screen for display based on an initial contact position of the input.

4. The apparatus of claim 1, wherein the origin screen represents a first interactive content associated with a first application and wherein the destination screen represents a second interactive content associated with a second application that is different from the first application.

5. The apparatus of claim 1, wherein the origin screen is a lock screen, and wherein the at least one memory and the computer program code are further configured to, with the processor, cause the apparatus to unlock the lock screen upon receipt of the input based on at least one of the position of the input and the directional relationship of the movement component of the input.

6. A method comprising:
   providing for display of an origin screen, wherein the origin screen comprises an arrangement of a plurality of first content items over an area of a device display;
   receiving an input from a user in one of a first predefined area or a second predefined area of the origin screen wherein the input comprises a movement component;
   determining a directional relationship of the movement component relative to a reference point, the directional relationship being either a first directional relationship with the reference point or a second directional relationship with the reference point;
   in an instance it is determined the movement component comprises the first directional relationship with the reference point:
      (a) determining a destination screen for display from a plurality of screens based on which of the first or second predefined areas in which the input is received, wherein the destination screen comprises an arrangement of a plurality of second content items over the area of the device display and the second content items are different from the first content items; and
      (b) providing for a visual transition from the origin screen to the destination screen, wherein, as a result of the visual transition, the plurality of first content items of the origin screen are no longer displayed on the device display and are replaced by the plurality of second content items such that the destination screen replaces the origin screen as a result of the visual transition and is presented for viewing in the area of the device display in place of the origin screen that was previously presented in the area; and
   in an instance it is determined the movement component comprises the second directional relationship with the reference point, disregarding the input for a purpose of transitioning from the origin screen to the destination screen.

7. The method of claim 6 further comprising providing an indication on the origin screen of an association of the first predefined area with a first destination screen and an association of the second predefined area with a second destination screen, respectively.

8. The method of claim 6, wherein determining the destination screen for display comprises determining the destination screen for display based on an initial contact position of the input.

9. The method of claim 6, wherein the origin screen represents a first interactive content associated with a first application and wherein the destination screen represents a second interactive content associated with a second application that is different from the first application.

10. The method of claim 6, wherein the origin screen is a lock screen, wherein determining the destination screen comprises unlocking the lock screen upon receipt of the input based on at least one of the position of the input and the directional relationship of the movement component of the input.

11. A computer program product comprising at least one non-transitory computer-readable storage medium having computer-executable program code portions stored therein, the computer-executable program code portions comprising program code instructions for:
providing for display of an origin screen, wherein the origin screen comprises an arrangement of a plurality of first content items over an area of a device display;
receiving an input from a user in one of a first predefined area or a second predefined area of the origin screen wherein the input comprises a movement component;
determine a directional relationship of the movement component relative to a reference point, the directional relationship being either a first directional relationship with the reference point or a second directional relationship with the reference point;
in an instance it is determined the movement component comprises the first directional relationship with the reference point: (a) determining a destination screen for display from a plurality of screens based on which of the first or second predefined areas in which the input is received, wherein the destination screen comprises an arrangement of a plurality of second content items over the area of the device display and the second content items are different from the first content items; and
(b) providing for a visual transition from the origin screen to the destination screen, wherein, as a result of the visual transition, the plurality of first content items of the origin screen are no longer displayed on the device display and are replaced by the plurality of second content items such that the destination screen replaces the origin screen as a result of the visual transition and is presented for viewing in the area of the device display in place of the origin screen that was previously presented in the area; and
in an instance it is determined the movement component comprises the second directional relationship with the reference point, disregarding the input for a purpose of transitioning from the origin screen to the destination screen.

12. The computer program product of claim 11, further comprising program code instructions for providing an indication on the origin screen of an association of the first predefined area with the first destination screen and an association of the second predefined area with the second destination screen, respectively.

13. The computer program product of claim 11, wherein the program code instructions for determining the destination screen for display comprise program code instructions for determining the destination screen for display based on an initial contact position of the input.

14. The computer program product of claim 11, wherein the origin screen represents a first interactive content associated with a first application and wherein the destination screen represents a second interactive content associated with a second application that is different from the first application.

15. The computer program product of claim 11, wherein the origin screen is a lock screen, the program code instructions for determining the destination screen for display comprise program code instructions for unlocking the lock screen upon receipt of the input based on at least one of the position of the input and the directional relationship of the movement component of the input.

* * * * *